US006485560B1

(12) United States Patent
Scherer et al.

(10) Patent No.: US 6,485,560 B1
(45) Date of Patent: Nov. 26, 2002

(54) METHODS OF PROTECTING CONCRETE FROM FREEZE DAMAGE

(75) Inventors: George W. Scherer, Pennington, NJ (US); Jeffrey Chen, Evanston, IL (US); John Valenza, Lambertville, NJ (US)

(73) Assignee: The Trustees of Princeton University, Princeton, NJ (US)

( * ) Notice: Subject to any disclaimer, the term of this patent is extended or adjusted under 35 U.S.C. 154(b) by 0 days.

(21) Appl. No.: 09/562,213

(22) Filed: Apr. 28, 2000

Related U.S. Application Data
(60) Provisional application No. 60/131,447, filed on Apr. 28, 1999.

(51) Int. Cl.$^7$ .......................... C04B 16/08; C04B 20/00; C04B 38/08; C04B 38/00
(52) U.S. Cl. .................. 106/672; 106/676; 106/677
(58) Field of Search ............................ 106/677, 676, 106/672

(56) References Cited

U.S. PATENT DOCUMENTS 3,989,534 A * 11/1976 Plunguian et al. ............. 106/88
4,324,838 A * 4/1982 Ballard et al. ................ 106/86
5,641,584 A * 6/1997 Andersen et al. ........... 106/805

OTHER PUBLICATIONS

Attiogbe, E.K., "Mean Spacing of AirVoids in Hardened Concrete," ACI Materials Journal, vol. 90, No. 2, Mar.–Apr. 1993, pp. 174–181.
Attiogbe, E.K., "Predicting Freeze–Thaw Durability of Concrete—A new Approach," ACI Materials Journal, V. 93, No. 5, Sep.–Oct. 1996, pp. 457–464.
Badger, et al., "Ice Formation in Hardened Cement Paste, Part I—Room Temperature Cured Pastes with Variable Moisture Contents," Cement and Concrete Research, vol. 16, pp. 706–720, 1986, No Month.
Badger, et al., "Ice Formation in Hardened Cement Paste, Part II—Drying and Resaturation on Room Temperature Cure Pastes," Cement and Concrete Research, vol. 16, pp. 835–844, 1986, No Month.
Badger, et al., "Ice Formation in Hardened Cement Paste Part III—Slow Resaturation of Room Temperature Cured Pastes," Cement and Concrete Research, vol. 17, pp. 1–11, 1987, No Month.
Charlesworth, et al., "Evaporation from Drops Containing Dissolved Solids," Journal of the American Institute of Chemical Engineering, vol. 6, No. 1, pp. 9–23, 1960, No Month.
Fletcher, N.H., "Active Sites and Ice Crystal Nucleation," Journal of the Atmospheric Sciences, vol. 26, 1969, pp. 1266–1271, No Month.
Fletcher, N.H., "The Chemical Physics of Ice," Cambirdge at the University Press, Cambridge, 1970, pp. 73–103, No Month.
Fletcher, N.H., "Entropy Effect in Ice Crystal Nucleation," The Journal of Chemical Physics, vol. 30, No. 6, 1959, pp. 1476–1482, No Month.

(List continued on next page.)

Primary Examiner—Elizabeth D. Wood
(74) Attorney, Agent, or Firm—Wolff & Samson

(57) ABSTRACT

A method of protecting a cementitious mixture from freeze damage is provided. The method consists of incorporating an entrainment air composition into the cementitious mixture to form air voids in the concrete, and further adding an effective agent for nucleating ice, preferably, in the air voids, such that upon the freezing of concrete formed from the cementitious mixture, ice is nucleated in the air voids. In one embodiment, the air entrainment composition includes ceramic shells, which could be impregnated with an agent for nucleating ice such as metaldehyde.

29 Claims, 7 Drawing Sheets

OTHER PUBLICATIONS

Flecther, N.H., "Nucleation and Growth of Ice Crystals Upon Crystalline Substrates," Autralian, Journal of Physics, vol. 13, No. 2A, 1959, pp. 408–419, No Month.

Fletcher, N.H., "Size Effect in Heterogeneous Nucleation," The Journal of Chemical Physics, vol. 29, No. 3, 1958, pp. 572–576, No Month.

Fukata, N., "Experimental Studies of Organic Ice Nuclei," Journal of the Atmospheric Sciences, vol. 23, 1966, pp. 191–196, No Month.

Fukuta, N., "Ice Nucleation by Metaldehyde," Nature, vol. 199, 1963, pp. 475–476, No Month.

Fukuta, N., "Some Remarks on Ice Nucleation by Metaldehyde," in Proceedings of the International Conference on Cloud Physics, Aug. 26–30, 1968, Toronto, pp. 194–198, No Month.

Garten, et al., "A Theoretical Basis of Ice Nucleation by Organic Crystals," Nature, vol. 205, pp. 160–162, 1965, No Month.

Gavish, et al., "Ice Nucleation by Alcohols Arranged in Monolayers at the Surface of Water Drops," Science, vol. 250, 1990, pp. 973–975, No Month.

Gurian–Sherman, et al., "Bacterial Ice Nucleation: Significance and Molecular Basis," The FASEB Journal, vol. 7, Nov. 1993, pp. 1338–1343, No Month.

Head, R.B., "Ice Nucleation by Some Cyclic Compounds," Journal of Physical Chemistry, vol. 23, Pergamon Press 1962, pp. 1371–1378, No Month.

Kreijger, P.C., "Effect of Admixtures on the Frost Resistance of Early–Age Concrete," in RILEM–ABEM International Symposium on Admixtures for Mortar and Concrete, Brussels, pp. 235–244, 1967.

Liu, et al., "Design Gudelines and Water Extraction Synthesis Capabilities for Hollow Ceramic Microspheres for Low Dielectric Constant Inorganic Substances," Materials Research Society Symposium Proceedings, vol. 372, Materials Research Society, 1995, pp. 231–237, No Month.

Marchand, et al., "Deterioration of Concrete due to Freezing and Thawing," Materials Science of Concrete IV, pp. 283–354.

Messing, et al., "Ceramic Powder Synthesis by Spray Pyrolysis," Journal of the American Ceramic Society, vol. 76, No. 11, 1993, pp. 2707–2726, No Month.

Pattnaik, et al., "Bacterial Ice Nucleation: Prospects and Perspectives," Current Science, vol. 72, No. 5, Mar. 10, 1997, pp. 316–320.

Pauling, L., "The Structure and Entropy of Ice and of Other Crystals With Some Randomness of Atomic Arrangement," Journal of the American Chemical Society, vol. 57, 1935, pp. 2680–2684, No Month.

Popovitz–Biro, et al. "Induced Freezing of Supercooled Water into Ice by Self–Assembled Crystalline Monolayers of Amphiphillic Alcohols at the Air–Water Interface," Journal of the American Chemical Society, vol. 116, 1994, pp. 1179–1191, No Month.

Powers, et al., "Theory of volume changes in hardened portland–cement paste during freezing", Proc. Highway Res. Board, vol. 32, 1953, pp. 285–297, No Month.

Scherer, G.W., "Crystallization in pores", Cement and Concrete Research, vol. 29, 1999, pp. 1347–1358, No Month.

Scherer, G.W., "Freezing Gels," Journal of Non–Crystalline Solids, vol. 155, 1993, pp. 1–25, No Month.

Setzer, M.J., "Interaction of Water with Hardened Cement Paste" in Ceramic Transactions, vol. 16: Advances in Cementitious Materials, Ed. Sidney Mindness, The American Ceramic Society: Westerville, OH, 1990, pp. 415–439, No Month.

Takamuru, et al., "Thermal Property, Structure, and Dynamics of Supercooled Water in Porous Silica by Calorimetry, Neutron Scattering and NMR Relaxation," Journal of Physical Chemistry B., vol. 101, 1997, pp. 5730–5739, No Month.

Vonnegut, "The Nucleation of Ice Formation by Silver Iodide," Journal of Applied Physics, vol. 18, No. 7, Jul. 1947, pp. 593–595.

Weissbuch, et al., "Understanding and Control of Nucleation, Growth, Habit, Dissolution and Structure of Two– and Three Dimensional Crystals Using 'Tailor–Made' Auxiliaries," Acta Crystallographica Section B, vol., 51, pp. 115–148 (1995), No Month.

Wolber, P.K., "Bacterial Ice Nucleation," Advances in Microbial Physiology, vol. 34, 1993, pp. 203–237, No Month.

* cited by examiner (a) ABIETIC SALT (b) OLEIC ACID (Z-9-OCTADECENOIC ACID)

(c) ORTHODODECYLBENZNENE SULPHONATE (d) SODIUM DODECYL SULPHATE (e) NONYLPHENOL ETHOXYLATES

METHODS OF PROTECTING CONCRETE FROM FREEZE DAMAGE

RELATED APPLICATIONS

This application claims the benefit of provisional application U.S. Ser. No. 60/131,447 filed Apr. 28, 1999. This application is incorporated herein by reference.

BACKGROUND OF THE INVENTION

Field of the Invention

This invention relates to a process whereby the nucleation of ice within concrete is controlled. It is current practice to protect concrete against frost damage by introducing air voids, which are generated by adding surfactants with the cement paste. Those voids protect against one mechanism of damage (hydraulic pressure), but not against crystallization pressure. By introducing nucleating agents into the voids, ice can be forced to occur only in the voids, and this will further reduce frost damage.

Concrete, like all porous media, has the ability to retain and absorb moisture. Under freezing conditions, ice can grow within the concrete pores, leading to significant internal cracking of the cement matrix and/or scaling of the concrete surface. While the precise mechanisms of frost action are not known, concrete deterioration is believed to result from three important forces: crystallization, hydraulic and diffusion/osmotic pressures. These mechanisms are thought to produce flows of metastable water in the concrete pores that generate sufficiently high stresses to induce fracture of the cement matrix. To reduce the internal pressures, air-entrained voids are often placed within the cement matrix to provide escape boundaries for the flow of unstable water.

From experimental evidence, properly air-entrained concrete samples have given consistently good results in terms of the ASTM C 666 standard freeze-thaw tests. However, in practice, the technique of air entrainment has several disadvantages such as inconsistencies in spacing factors (means half-distance between voids) and uncertainties in bubble stability. Both issues have caused frequent discrepancies between expected and actual frost durability.

Numerous references in this area are discussed in the Detailed Description section of this application.

OBJECTS AND SUMMARY OF THE INVENTION

It is a primary object of this invention to protect concrete from freeze damage.

It is a further object of this invention to provide a simple, inexpensive, and easy to use method of protecting concrete from freeze damage.

It is another object of the present invention to add an effective amount of nucleating agent to a cementitious mixture to nucleate ice in concrete.

It is a further object of the present invention to provide a nucleating agent in concrete which can be added during mixing.

It is even a further object of the invention to provide porous ceramic or clay shells for air entrainment in concrete, and to provide a method of making such shells.

These objects and others are achieved by the method of protecting a cementitious mixture from freeze damage according to the present invention. The method comprises incorporating air into a cementitious mixture to form air pores in the cementitious mixture, including an air entrainment agent, and adding an effective amount of, preferably, metaldehyde, or an equivalent nucleating compound for nucleating ice in the air pores upon the freezing of concrete. The nucleating agent is added to the cementitious mixture during the normal mixing process. Other nucleating agents may be used. Preferably the air entrainment composition contains a surfactant. Because ice nucleating agents are hydrophobic, when mixed with a surfactant, which is normally used for forming air voids, the metaldehyde particles associate themselves with the surfactant and become incorporated within air voids formed in the concrete. Optionally, the air entrainment is achieved by using porous ceramic shells, which could be used alone or which could be impregnated with metaldehyde or another ice nucleating agent. Preferably, the metadehyde consists of tetrameric units $(CH_3CHO)_4$, rather than polyacetaldehyde chains.

BRIEF DESCRIPTION OF THE DRAWINGS

Other important objects and features of the invention will be apparent from the following Detailed Description of the Invention taken in connection with the accompanying drawings in which.

DETAILED DESCRIPTION OF THE INVENTION

Structure of Cement and Concrete

The character of the cementitious porous network is deeply integrated with the concrete's freezing properties. Any change in the former necessarily dictates the behavior of the latter. A large part of the reason for uncertainties in frost deterioration stems from the complex microstructure of concrete. Due to the nature of the hydration reaction, voids range from the nanometer (gel pores) to the millimeter scale (capillary pores). Setzer, M. J., "Interaction of Water with Hardened Cement Paste" in Ceramic Transactions, Vol. 16: Advances in Cementitious Materials, Ed. Sidney Mindness, The American Ceramic Society: Westerville, Ohio, 1990, devised a three-tier classification scheme that includes the structured surface water, the capillary condensed water and the macroscopic bulk water.

| Pore classification scheme indicating the broad range of pore sizes present in the cement matrix. | | |
|---|---|---|
| Name | Upper radius | Pore water classification |
| Macro Capillaries | 2 mm | Macroscopic bulk water |
| Meso Capillaries | 50 µm | Macroscopic bulk water |
| Micro Capillaries | 2 µm | Macroscopic bulk water |
| Mesopores | 50 nm | Condensed water |
| Micropores | 2 nm | Structured surface water |

The pore size distribution in concrete is not a fixed parameter. It will vary with chemical composition, aging and the water to cement ratio, Mehta P. K., Concrete: Structure, Properties and Materials, Prentice-Hall, N.J., 1986.

Figure 1:
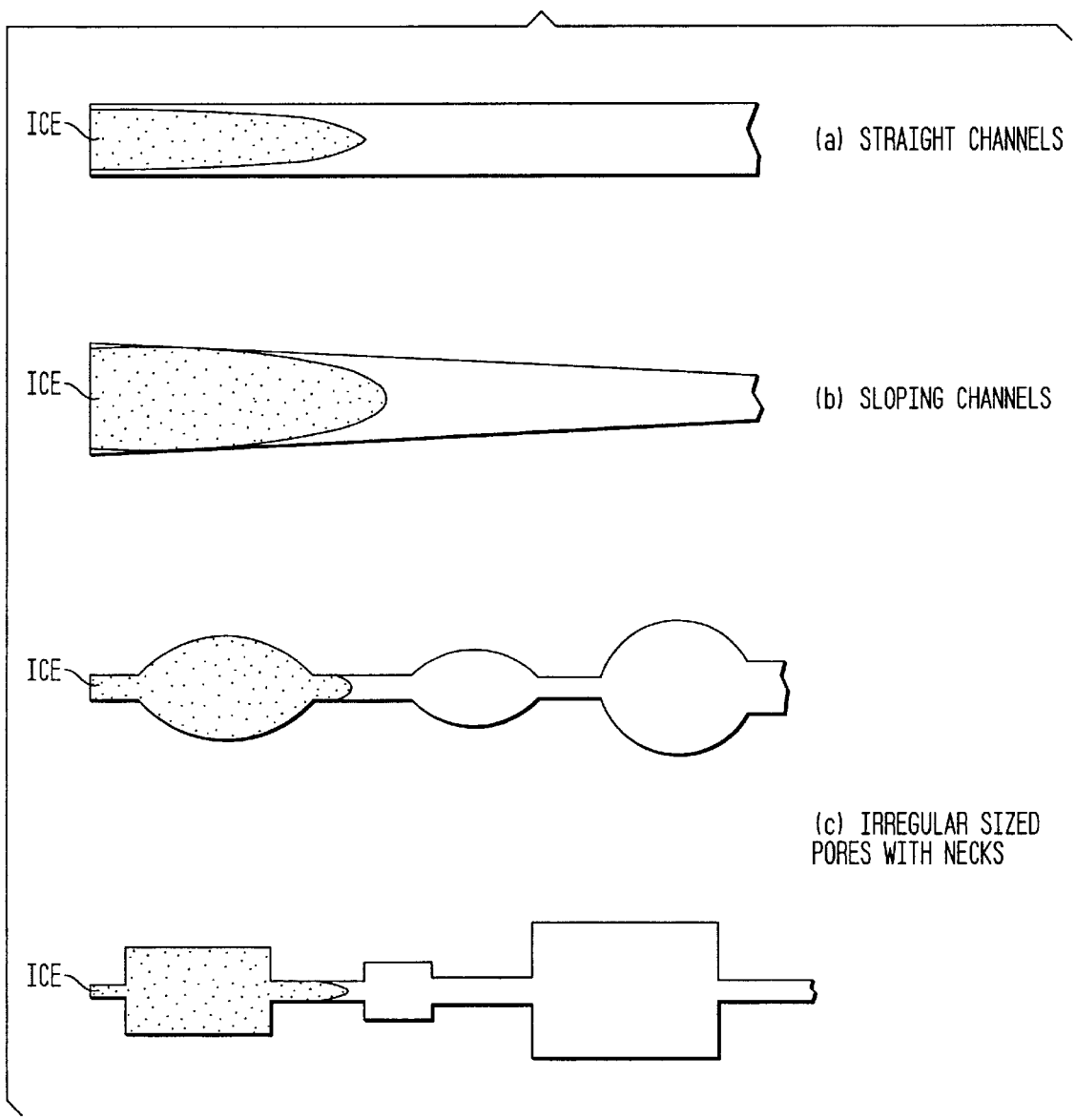
FIG. 1 is a schematic of approximations of pore geometry in cement paste in: (a) Straight channels; (b) sloping channels; (c) irregular sized pores with necks that connect to larger pores.

An analysis of the freezing behavior in cement paste will require some approximations of the geometry of the porous network. FIG. 1 shows some plausible simplifications of the pore geometry, and shows ice formed therein. As will be discussed in detail, the geometry and connectivity of the porous network will have a profound influence on the durability of concrete.

Freezing within the Pores of Concrete

It is well known that the freezing properties of a liquid in a porous medium are significantly altered. The phenomenon is due to the interaction between the liquid (absorbate) and the solid pore surface (absorbent). The nature and intensity of the interactions is a function of the chemical and geometrical features of the pore wall and of the distance between the absorbate molecules from the absorbent surface. Collectively, these forces have the effect of depressing the freezing point of the pore liquid. Thermodynamic expressions relating the freezing point depression to the geometry of the pore are well established, Defay R. and Prigogine, I., Surface Tension and Adsorption, Wiley: New York, 1966; Scherer, G.W., "Freezing Gels," Journal of Non-Crystalline Solids, V. 155, 1994, pp. 1–25; Marchand. J., Plea, R. and Gagné, R., "Deterioration of Concrete due to Freezing and Thawing," in Materials Science of Concrete IV, 1991.

Figure 2:
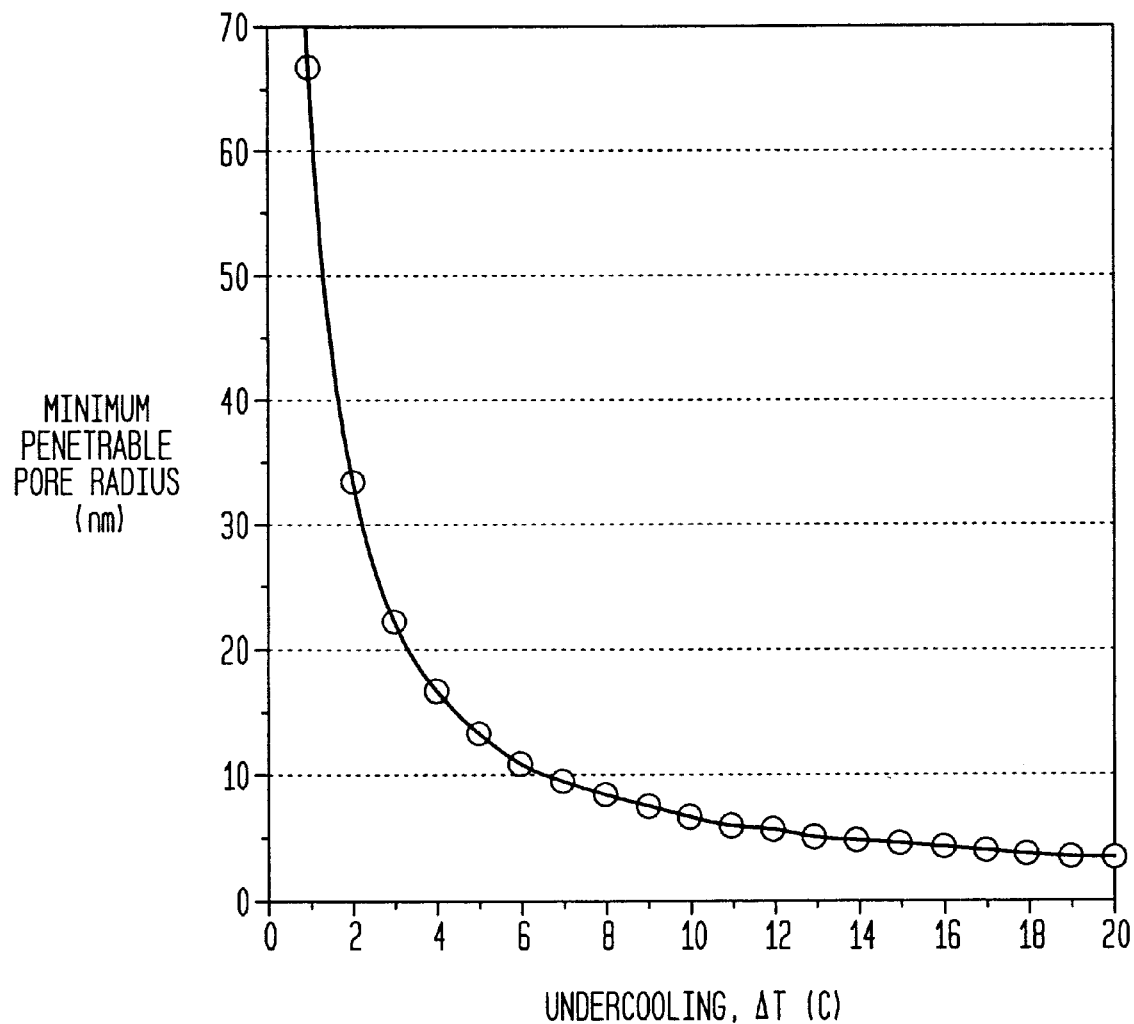
FIG. 2 is a graph of theoretical minimum pore radius that a growing ice crystal can penetrate as a function of undercooling.

Theoretical considerations imply that the smaller pores will have lower melting temperatures than the larger pores. Thus, the crystal will only invade the pore when the crystal has undercooled to a lower temperature, and is able to adopt the required radius of curvature of the small pore. Furthermore, theoretical considerations predict that freezing will occur in a progressive manner; that is, freezing is initiated in the larger pores and then penetrates into smaller ones as the undercooling increases (Scherer, G. W. 1999, "Crystallization in pores", Cement and Concrete Research, Vol. 29, pp. 1347–1358). This has been confirmed experimentally by various low temperature investigations of cement paste by either calorimetry or nuclear magnetic resonance (NMR) imaging techniques (Banthia, 1989, Badger, D., "Ice Formation in Hardened Cement Paste Part I—Room Temperature Cured Pastes with Variable Moisture Contents," Cement and Concrete Research, Vol. 16, pp. 706–720; Badger, D., "Ice Formation in Hardened Cement Paste Part II Drying and Resaturation on Room Temperature Cure Pastes," Cement and Concrete Research, Vol. 16, pp. 835–844; Badger, D., "Ice Formation in Hardened Cement Paste Part III—Slow Resaturation of Room Temperature Cured Pastes," Cement and Concrete Research, Vol. 17, pp. 1–11; Prado, P., Balcom. B., Beya, S., Bremmer, T., Armstrong, R. and Grattan-Bellew, P., "Concrete Freeze/Thaw as Studied by Magnetic Resonance Imaging," Cement and Concrete Research Vol. 28, No. 2, 1998, pp. 261–270). This progressive-freezing phenomenon can be seen graphically in FIG. 2, which implies that for an undercooling of $\Delta T=7°$ C., ice will not be present in pores smaller than ~10 nm.

We can picture a growing ice front initiating at the surface and then penetrating into the tortuous, interconnected porous network. At a given undercooling, ice will advance until the ice front is impeded by smaller pores that require a greater undercooling. The ice front will percolate through the entire body, only when able to penetrate a critical breakthrough radius, $r_{BT}$. Once entering the breakthrough pore at a characteristic undercooling, $\Delta T_{BT}$, the ice front will be able to travel unimpeded in pores of radius$>r_{BT}$.

The breakthrough radius, $r_{BT}$ (or equivalently, $\Delta T_{BT}$), is equivalent to the characteristic pore size that controls the permeability of porous bodies (Katz, A. J., and Thompson, A. H., Journal of Geophysical Research, Vol. 92, No. B1, 1987, pp. 599). Thus, highly permeable materials should have correspondingly larger breakthrough radii than less permeable materials. In many porous materials, the $r_{BT}$ lies near the inflection point in a mercury penetration curve, thus corresponding to the mean pore entry radius. Various $r_{BT}$ with their respective $\Delta T_{BT}$ (governed by eq. 3.7) are shown in Table 3.2.

| Breakthrough radius, $r_{BT}$, with respective breakthrough undercooling, $\Delta T_{BT}$. | |
|---|---|
| Breakthrough radius, $r_{BT}$ [nm] | Breakthrough undercooling, $\Delta T_{BT}$ [° C.] |
| 5 | 13.3 |
| 10 | 6.7 |
| 15 | 4.4 |
| 20 | 3.3 |
| 25 | 2.7 |
| 30 | 2.2 |

It is difficult to obtain a definitive $r_{BT}$ for cement paste since the pore structure, and hence the breakthrough conditions, will vary depending on parameters such as the water to cement ratio (w/c), temperature, age and additive concentration. From mercury intrusion curves generated for cement pastes with a range of w/c ratios, a 0.4 w/c ratio paste is expected to have a $r_{BT}$ of ~15 nm to ~20 nm.

The cement paste in concrete will have higher porosities than plain hydrated paste due to the presence of highly permeable interfacial transition zones (ITZ) surrounding aggregates (Winslow, D. N., Cohen, M. D., Bentz, D. P, Synder. K. A. and Garboczi, E. J., "Percolation and Pore Structure in Mortars and Concrete," Cement and Concrete Research, Vol. 24, No. 1, 1994, pp. 25–37). The $r_{BT}$ for cement paste in concrete is therefore higher than the corresponding $r_{BT}$ for plain cement paste. However, common additives for concrete such as silica fume, with practicle size ~3 orders of magnitude smaller than that of cement particles, will significantly decrease the permeability of a concrete by reducing $r_{BT}$.

Figure 3:
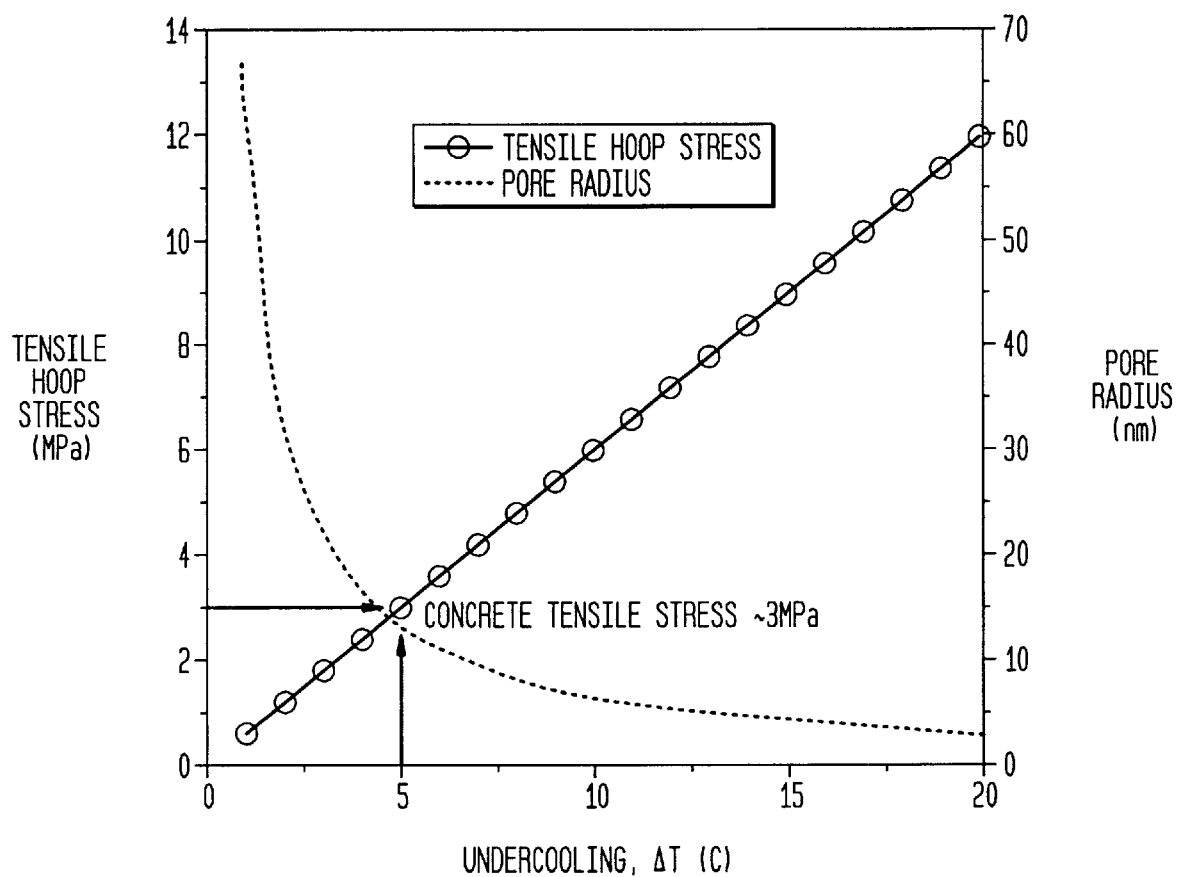
FIG. 3 is a graph of tensile stresses induced by crystallization pressures at increasing undercoolings.

Crystallization pressure can be defined as the pressure of the growing ice crystal on the pore wall. Theoretical calculations and considerations, as shown in FIG. 3, indicate that crystallization pressures will potentially exceed the concrete tensile strength (about 3 MPa) at undercoolings greater than or equal to 5° C. and pore radii less than or equal to 13.3 nm.

To cause fracture, the generated tensile stresses must act on the flaws in the pore wall. At the breakthrough temperature, $T_{BT}$, most of the pore volume has frozen, implying that all of the flaws (including the most damaging large flaws) in the body should feel the stress at that point. Hence, crack propagation is expected to strongly correlate with the propagation of the ice front at $T_{BT}$.

After ice has propagated and cracking has initiated in the body, the effect of crystallization pressures at lower temperatures important. As long as there is water in contact with the ice, crystals will form at sufficiently low temperatures, and crystallization pressures will be present. There are generally small isolated pockets of unfrozen water even after percolation. Thus, when the temperature drops below $T_{BT}$ there is crystallization pressure as the ice front is penetrating into the smaller pores of the unfrozen pockets. The generated stresses could be quite high (>10 Mpa) but likeliho od of failure is dependent on the whether stresses are brought to bear on flaws in the small pores.

It is highly probable that the percolation event at $T_{BT}$ will accelerate crystallization pressure damage by amplifying stresses on the largest flaws in the body. It is desirable that nucleation in the air voids occur at a temperature above the $T_{BT}$; in that way, the freezeable water is removed from the pores before stresses are applied to-the largest flaws in the body. Moreover, it is prefeired that nucleation occur above about ~5° C., thereby confining the ice growth to the air voids before stresses can theoretically exceed ~3 MPa.

Water has the unusual property that the liquid phase ($\rho$=1.00 g/cm$^3$) is more dense that the solid phase ($\rho$=0.92 g/cm$^3$). This property has very important repercussions in the freezing of porous media since ice necessarily undergoes a 9% expansion. The volume change forces water ahead of the growing crystal thus creating a pressure gradient in the pore.

Figure 4:
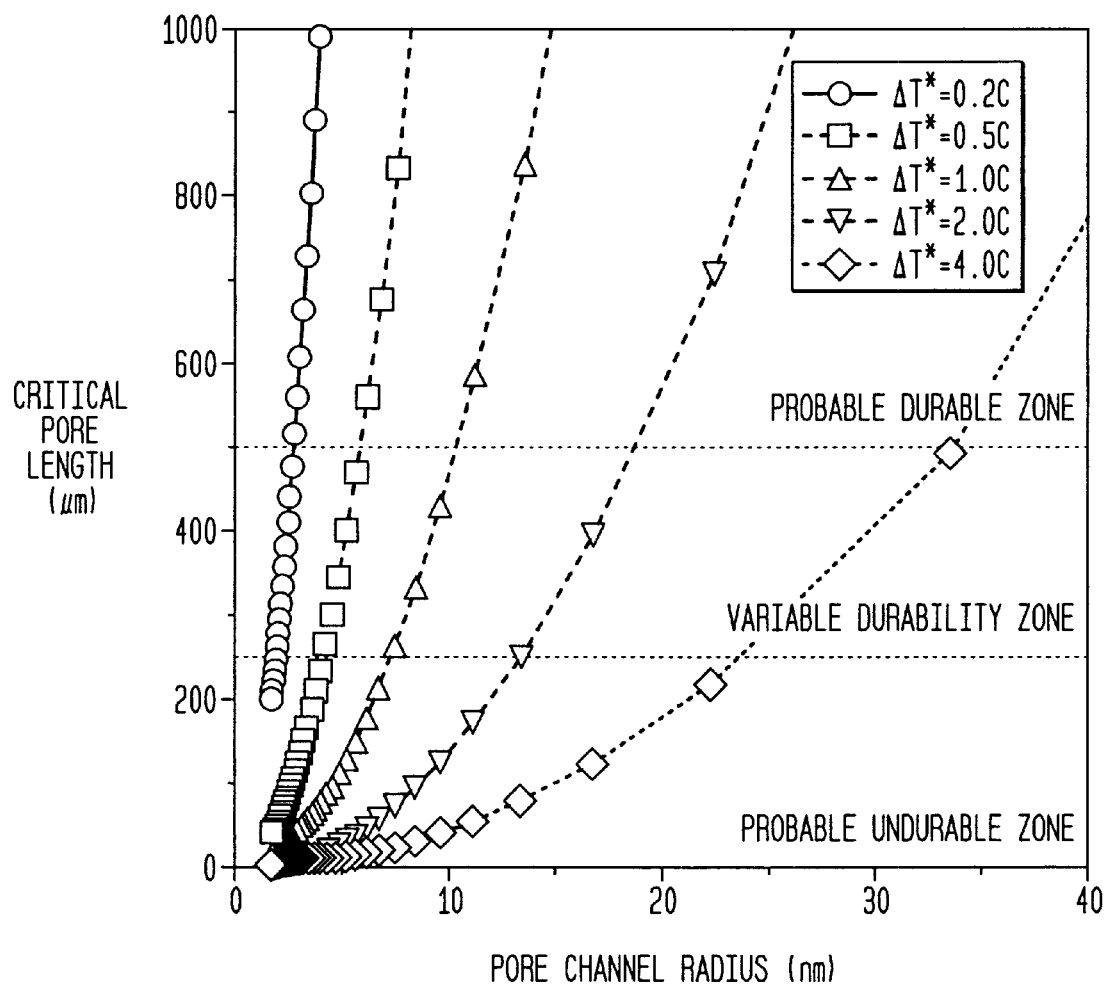
FIG. 4 is a graph of critical pore length as a function of pore radius and super-undercooling.

Based on theoretical consideration, FIG. 4 shows the maximum length the displaced water can travel before generating tensile stresses exceeding that of concrete. Thus, if an ice crystal is growing in a 10 nm pore with a $\Delta T^*$ of 1° C., cracking of the pore wall will potentially occur if the displaced water does not reach an escape boundary by the time it travels ~470 $\mu$m. FIG. 4 also suggests that ice growth in small pores with large super-undercoolings will be the most damaging (i.e., having the lowest critical pore lengths). Furthermore, with increasing $\Delta T^*$, the slope of the critical pore length curve will necessarily decrease, causing larger pores to enter into the probable vulnerable zone. As the percentage of the "nondurable pores" increases, the resistance to hydraulic pressure damage necessarily decreases.

A crystal front must be growing (possessing a finite velocity) for hydraulic pressures to generate. However, if the temperature has not reached the breakthrough conditions, the ice front will most likely be in a stationary state, pressing against the pore walls, and hence, creating negligible hydraulic pressures. Only when the breakthrough conditions have been met (namely $\Delta T_{BT}$ and $r_{BT}$) will an ice front be able to grow for extended lengths, and thereby create significant hydraulic pressures. Now, we can picture a crystal just penetrating a pore of size $r_{BT}$ at an undercooling of $\Delta T_{BT}$. As the crystal front percolates through a network of pores with radii change depending on the size of the pore. Hence, the ice front will pulse along the percolation path with the greatest velocities occurring in the larger pores. Moreover, since the tensile hoop stress in the pore wall is a function of $\Delta T^*$ (power dependence of 1.7) and $r_p$ (inverse square dependence), the stresses generated will also vary with changes in pore sizes.

The freezing rate in nature is low with a maximum rate of 6° C./hr. Thus, one can reasonably assume that the temperature remains constant at the breakthrough temperature, $T_{BT}$, throughout the entire percolation event. For a modest super-undercooling of $\Delta T^*$=1.0° C. at breakthrough conditions (thus the front is free to travel long distances) an ice front can move ~6 m in one hour. With this speed, concrete slabs will fully crystallize before the temperature drops far below the breakthrough temperature, $T_{BT}$.

Theoretical considerations predict the damaging effect of inducing hydraulic pressures in a very fine porous network (possessing a small characteristic $r_{BT}$). For a $r_{BT}$ of 10 nm, stresses can approach devastating stresses of ~30 MPa when invading larger pores. Furthermore, such theoretical considerations contradict the idea that concrete will necessarily be less prone to frost damage if it is less permeable. It is certainly true that concrete will be completely protected if there is absolutely no freezeable water present in the pores. However, this level of impermeability is very difficult to achieve even with very fine porous networks. Moreover, theoretical considerations confirm the generally accepted notion that high strength (compressive strengths >~100 Pa) and silica fume concretes are very susceptible to damage in winter climates (Mehta, P. K., "Durability—Critical Issues for the Future," Concrete International, July, 1997, pp. 27–33). Most likely this susceptibility is due to the low characteristic breakthrough radii for these very fine concretes.

Maximum tensile stresses generated from hydraulic pressures for a specific $r_{BT}$ with the assumption that the maximum pore size is ~50 nm.

| Breakthrough radius, $r_{BT}$ [nm] | Maximum tensile stress [MPa] |
|---|---|
| 5 | 433.6 |
| 10 | 27.3 |
| 15 | 4.9 |
| 20 | 1.3 |
| 30 | 0.1 |

As mentioned earlier, the $r_{BT}$ for cement paste in concrete should vary from sample to curing environment. Assuming a maximum pore size of 50 nm as before, it can be calculated that stresses are expected to be greater than 3 MPa only when $r_{BT}$ is less than about 16.7 nm. The $r_{BT}$ was estimated for plain cement pastes to be ~15 nm to ~20 nm, so it is not unreasonable to assume that concrete can possess a $r_{BT}$ of 16.7 nm, which would imply potentially damaging tensile stresses.

Up to this point, it has been assumed that ice is present in the cement pores prior to reaching the breackthrough temperature. Equivalently, this assumption implies that heterogenous nucleation has occurred near 0° C., presumably at the surface where foreign catalysts are most probable. While there have not been any extensive studies on surface nucleation for concrete in the environment, there have been some studies on laboratory quality samples. Calorimetry experiments by Badger and Banthia, et al. revealed an initial freezing peak near ~10° C. and either one or two peaks between −20° C. to −40° C. Both papers agree that the initial peak corresponded to the nucleation of the ice at the surface of the sample. Badger further cited that the initial peak could be shifted towards higher temperatures by adding AgI (effective ice nucleant at T=~−4° C.) on the surface of the sample. Of course, the laboratory samples studied in these calorimetry experiments will probably not contain potential natural ice nuclei such as some active bacteria which are known to induce crystallization on non-coniferous plants as high as −2° C. (Vali, 1971). However, it is also doubtful that there will always be a high enough concentration of these effective nucleating agents on exposed concrete surfaces.

Thus, if a concrete surface is "clean," nucleation on the surface could very well be delayed to −10° C. as in the laboratory samples. The most important implication of a delayed surface nucleation is that percolation can now occur at temperatures lower than $T_{BT}$. If nucleation occurs at a temperature, $T_N$, which is lower than $T_{BT}$, the percolation event can occur at the lower temperature, leading to higher $\Delta T^*$, and hence, higher tensile stresses.

Besides the initial expansion of concrete at the onset of freezing, concrete undergoes considerable shrinkage during freezing if held at a constant sub-zero temperature. It has been hypothesized that the ice crystals that were initially formed in the larger pores could feed off the unfrozen water in the neighboring nanosized gel pores (Powers, T. C. and Helmuthm, R. A. 1953, "Theory of volume changes in hardened portland-cement paste during freezing", Proc. Highway Res. Board, Vol. 32, pp. 285–297). This ice accretion mechanism is thought to be a result of the free energy gradient between the crystal and the unfrozen gel water. At the onset of crystallization, the ice and gel water are in equilibrium. As the undercooling increases, the gel water (having greater entropy) should gain free energy at a faster rate than the crystal. Thus, to regain equilibrium, the gel water migrates to the growing crystal and is allowed to shrink.

Osmotic pressure theories were later added to account for the shrinkage of concrete during prolonged freezing periods. The origin of osmotic pressures is that salt is highly insoluble in ice. Consequently, very steep salt gradients accumulate at the ice/water interface. Moreover, since ice will tend to initiate near the surface of concrete structures (as a result of minimum temperatures), the highest salt gradients should occur near the surface. Amplifying the effect is the use of surface deicer salts on concrete roads. The net result is a migration of the dilute gel water to the high salt concentration at the surface and shrinkage of the interior concrete layers. The combination of the shrinkage of the interior gel layers and the expansion from freezing in the saturated surface layer produces potentially destructive stresses.

Air Entrainment Agents

Introducing a nucleating agent directly in the air voids initiates ice growth in the large air voids and minimizes the internal pressures created by the metastable water (whether from hydraulic or diffusion/osmotic mechanisms).

The purpose of an air-entrainment agent is not to entrain air bubbles, which is done mechanically in the mixer, but to stabilize the bubbles in the cement matrix. The role of the air-entrainment molecules is to stabilize the air-water interface, reduce the surface tension of water (by as much as ~20%), and to bind the air bubbles to the cement particles. Most air-entrainment compounds are aqueous solutions of ionic or nonionic surfactants, implying the presence of hydrophilic heads and hydrophobic tails. Air-entrainment molecules stabilize air bubbles by adsorbing at the air/water interface with their hydrophobic ends protruding into the air-void itself and their hydrophilic ends remaining in the aqueous phase.

Commercial air-entrainment products are typically dilute aqueous solutions (5% to 20% by weight) of surfactants (Rixom, M. R. and Mailvaganam, N. P., Chemical Admixtures for Concrete, E.&F.N. Spon.: London, 1986). In practice, there are five basic groups of surfactants suitable for concrete use (shown in order of probably decreasing use):

(a) Abietic and pimeric acids salts (neutralized wood resins)
(b) Fatty acid salts
(c) Alkyl-aryl sulphonates
(d) Alkyl sulphates
(e) Phenol ethoxylates.

Figure 5:
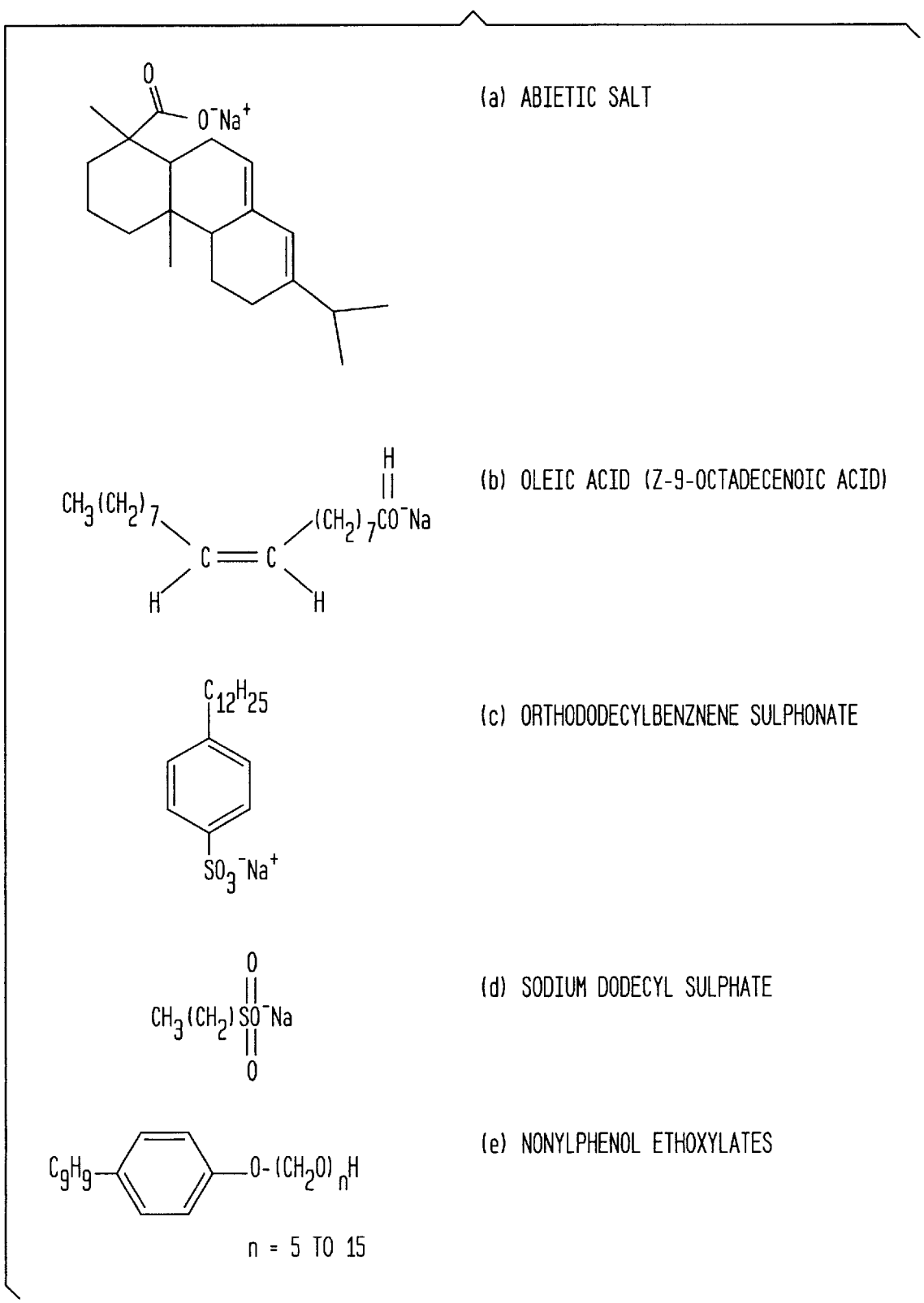
FIG. 5 shows typical air-entrainment compounds used in practice today.

The chemical structure of a representative of each group can be seen in FIG. 5.

What is interesting about the different air-entrainment compounds seen in FIG. 5 is that they possess varying degrees of freeze-thaw resistance at a given total air-content. This implies that there is a chemical interaction taking place in the air-voids between the air-entrainment and water molecules. Kreijer, C. I., "Effect of Admixtures on the Frost Resistance if Early-Age Concrete," in RILEM-ABEM International Symposium on Admixtures for Mortar and Concrete, Brussels, pp. 235–244, 1967, showed that for an air content of ~5%, sodium oleate produced the best freeze-thaw resistance while phenol ethoxylate showed very little improvement over the non-air-entrained control sample. The reasoning for this discrepancy is that an air void can obviously not serve as a sink for displaced water if it is already full of water. The water-free void will be ensured if the tails of the air-entrainment molecules are highly hydrophobic. This explains partly why non-hydrophobic molecules such as phenol ethoxylate (capable of hydrogen-bonding on oxygens) yield poor freeze-thaw results while the hydrophobic oleaetes, sulphates and resins perform much better.

Varying freeze-thaw resistance of several air-entrainment admixtures.

| Air-entrainment admixture | Dosage (m./50 kg cement) | Air content (%) | Relative freeze-thaw Resistance[1] |
| --- | --- | --- | --- |
| None (control) | 0 | 2.0 | 5 |
| Sodium oleate (10% sol.) | 353 | 5.6 | 86 |
| Sodium lauryl sulphate | 18 | 5.8 | 46 |
| Pine resin | 15 | 5.2 | 57 |
| Phenol ethoxylate | 75 | 5.2 | 7 |

[1]An average of several techniques measuring changes in compressive strength and modulus after freeze-thaw cycling.

A discussion of the chemistry of air-entrainment molecules was presented since it is desired to introduce ice nucleating agents into the air voids. When selecting air-entrainment compounds, the chemical interaction between these molecules and the ice nuclei should be understood. A nucleating particle is thought to contain active sites and planes where nucleation is favored. If these active sites strongly interact with the air-entrainment molecules and "poison" the nucleating surface, the activity of the nucleating particle will correspondingly decrease. However, since it is desired to concentrate the nuclei in the voids and not in the cement pores, there needs to be some attractive forces present between the nuclei and air-entrainment molecule to ensure that the two settle in the voids after hydration. This attractive force must be sufficient to maintain the bond between the two compounds even after mixing of the concrete. But again, it must be remembered that the attractive force should not annul the nucleating properties, implying that a compromise must be established.

Nucleation of Ice

Although ice melts consistently at 0° C., pure liquid water can supercool to as low as −40° C. (Weissbuch, et al.; and Hobbs). The induction, or catalysis, of the freezing point to higher temperatures has many important consequences in nature. Vonnegut, B., Journal of Applied Physics, Vol. 18, 1947, pp. 593. was the first to identify that silver iodide could induce ice nucleation in atmospheric clouds at ~−4° C. His finding has spurred much research on other inorganic, organic (Fukata, N., "Experimental Studies of Organic Ice Nuclei," Journal of the Atmospheric Sciences, Vol. 23, 1966, pp. 191–196; Garten, 1965) and bacterial nuclei. (Maki L. R., Gaylam, E., Chang Chien, M. and Caldwell, D. R., Applied Microbiology, Vol. 28, pp. 456–459; Gurian-Sherman, D. and Lindlow, S. E., "Bacterial Ice Nucleation: Significance and Molecular Basis," The FASEB Journal, Vol. 7, November 1993, pp. 1338–1343; Wolber, P. K., "Bacterial Ice Nucleation," Advances in Microbial Physiology, Vol. 34, 1993, pp. 203–237; Pattnaik, P., Batish, V. K., Grover, S. and Ahmed, N., "Bacterial Ice Nucleation: Prospects and Perspectives," Current Science, Vol. 72, No. 5, Mar. 10, 1997, pp. 316–320. Fukuta, N., "Ice Nucleation by Metaldehyde," Nature, Vol. 199, 1963, pp. 475–476; Fukuta, N., "Some Remarks on Ice Nucleation by Metaldehyde," in Proceedings of the International Conference on Cloud Physics, August 26–30, 1968, Toronto, pp. 194–198, found that metaldehyde nucleated ice as high as −0.4° C. from the vapor phase. Frost inducing bacteria (Vali, 1971) was discovered to be the cause for much of the wide spread damage to nonconiferous plants due to nucleation of ice as high as −2° C. Recently, much research has been devoted to the nucleating properties of monolayers of amphiphillic alcohols ($C_nH_{2n+1}OH$). It has been found that $C_{31}H_{63}OH$ (n=31) could nucleate ice as high as −1° C. (Gavish, M., Popovitz-Biro, R., Lahav, M. and Leiserowitz, L., "Ice Nucleation by Alcohols Arranged in Monolayers at the Surface of Water Drops," Science, Vol. 250, 1990, pp. 973–975; Popovitz-Biro, R., Wang, J. L. Majewski, J., Shavit, E. Leiserowitz, L. and Lahav, M., "Induced Freezing of Supercooled Water into Ice by Self-Assembled Crystalline Monolayers of Amphiphillic Alcohols at the Air-Water Interface," Journal of the American Chemical Society, Vol. 116, 1994, pp. 1179–1191).

The basis of the theory of nucleation of new phases was established long ago by Volmer, M. and Weber, A., Zeitschrift fuer Physikalische Chemie, Vol. 119, 1325, pp. 277 and Becker, R., and Doring, W., Annalen de Physik (Lepzig), Vol. 5, No. 24, 1935, pp. 719, and remains virtually unchanged today. Within a supercooled liquid or a supersaturated vapor, there are transient groupings of the parent molecules with the structure of the stable phase (ice, in this case). These fortuitous embryos are unstable and are continuously being created and destroyed by thermal fluctuations in such a fashion that a Boltzman distribution in energy is maintained. The free energy barrier ($\Delta G^*$) associated with the formation of a stable embryo has a maximum value at a certain critical embryo size. Once the embryo reaches this size (or equivalently, when the embryo contains a critical number of water molecules) crystallization occurs spontaneously.

There are two mechanisms of ice nucleation commonly recognized (Fletcher, N. H., "Chemical Physics of Ice," Cambridge University Press, Cambridge, 1970, pp. 73–103). Homogenous nucleation refers to the spontaneous nucleation of ice crystallization in pure supercooled water. Nucleation by this mechanism requires overcoming a high free energy barrier due to the large surface free energy requirements. Heterogeneous nucleation involves the binding of supercooled water molecules to foreign particles to initiate nucleation. The presence of the particles promotes nucleation since it reduces the surface energy investment, and hence, the free energy barrier to nucleation.

Since homogeneous ice nucleation can only take place at temperature below −35° C. (Franks, 1985), most ice transformations in nature must occur by heterogeneous nucleation. This phenomenon can be explained by the high probability for foreign particles in naturally occurring liquid or vapor phases. An efficient nucleating agent is one that has a good lattice match, or structural fit, with the ice crystal (Fletcher, N. H., "Nucleation and Growth of Ice Crystals Upon Crystalline Substrates," Australian, Journal of Physics, Vol. 13, 1960, pp. 108–419; Fletcher, N. H., "Chemical Physics of Ice," Cambridge University Press, Cambridge, 1970, pp. 73–103). Fletcher, N. H. has discussed several other factors affecting nucleation, including the contact angle (between the ice crystal and substrate), nucleant size (Fletcher, N. H., "Size Effect in Heterogeneous Nucleation," The Journal of Chemical Physics, Vol. 29, No. 3, 1958, pp. 572–576), effects of topographical imperfections (Fletcher, N. H., "Active Sites and Ice Crystal Nucleation," Journal of the Atmospheric Sciences, Vol. 26, 1969, pp. 1266–1271) and an entropic consideration of the induced dipoles in the water molecules (Fletcher, N. H., "Entropy Effect in Ice Crystal Nucleation," The Journal of Chemical Physics, Vol. 30, No. 6, 1959, pp. 1476–1482).

The two most well-known nucleating substrates for ice are AgI and $PbI_2$ (identified by Vonnegut).

Experimental results show a wide range in the onset temperatures for various nuclei. The activity spectrum can be attributed to the distribution of "active sites" upon the surfaces of the nucleating particles (Fletcher, 1969). Active sites refer to the particular sites on the nucleating particle that have the highest probability of forming a stable embryo. For clarification, when saying that AgI has an onset nucleation temperature of −4° C., we are actually quantifying the nucleating ability of the active sites. Not all particles are active at −4° C.; indeed, to achieve 100% activity for AgI particles $\geq 100$ Å in radius, one must lower the temperature to −22° C. (Mussop, S. C. and Jayaweera, K. O. L. F., "AgI-NaI aerosols as ice nuclei," Journal of Applied Meteorology, Vol. 8, pp.241–248).

There are several general requirements for an efficient active site. First, the contact area between the embryo and the nucleus must be comparable with the total surface area of the embryo if the nucleus is to be effective. If the low energy site is too small, only a few water molecules will be captured and the resulting embryo will not be stable. Fletcher (1969) estimates that freezing nuclei must be on the order of $200/\Delta T$ [Å] if nucleating at $-\Delta T$ [° C.]. Also important is that the interfacial free energy of the particle-ice interface must be as low as possible. Thus, the chemical nature is clearly important since it dictates the bonding between the substrate and overgrowing ice crystal. The crystallographic nature of the substrate has an equally important role in the energy of the interface due to the specific alignment of the surrounding water molecules.

The residual entropy of the ice crystal structure influences the nucleation process. Fletcher (1959) was the first to explore the consequences of the randomly oriented water dipoles and claimed that there is an entropic penalty if a heterogeneous catalyst orients the dipoles parallel to the catalyst surface. The reasoning is that if the dipoles are ordered (as would be the case on a surface of uniform charge) the entropy of the ice structure would be reduced and the resulting free energy barrier would increase. Consequently, the uniformly charged surface would be a poor nucleating agent and require a larger undercooling for inducing crystallization.

From these theories, Fletcher predicts that the uniformly charged (either +1 or −1) basal surfaces {0001} of AgI and $PbI_2$ should be poor nucleating planes as a result of the entropic penalty. However, the prism faces of these crystals, having an equal distribution of positive and negative charges, will not orient the dipoles parallel to the surface (probably in the plane of the surface) and hence, be better nucleating planes. Another implication of Fletcher's theory is that the steps on basal and prism planes are not necessarily equivalent in terms of nucleating activity. Steps on basal planes, exposing prism faces, are good nucleating sites while steps on prism faces expose basal planes, and hence, are not expected to be good nucleating sites.

Fletcher's predictions were first confirmed experimentally by Edwards, L. F. and Evans, G. R., "Effect of Surface Charge on Ice Nucleation by Silver Iodide," Trans. Faraday Soc., Vol. 58, pp. 1649–1655, who found that AgI was most active at its isoelectric point. Isono, K. and Ishzaka, Y., Journal de Recherches Atmospheriques, Vol. 6, 1972, pp. 283, showed that the (111) face of pure γ-AgI and the (1010) face of pure β-AgI (where both $Ag^+$ and $I^-$ are present) were more active than the (0001) face of β-AgI (where either $Ag^+$ or $I^-$ are present). Pruppacher, et al., (1975) etched a ferroelectric substrate creating adjacent positively and negatively charged domains and founds that ice preferentially nucleated on the boundaries rather than within a uniformly charged domain. It was concluded that by nucleating on the boundaries between the domains, the water molecules could randomly orient in the plane of the substrate, thereby eluding Fletcher's entropic penalty.

From overwhelming experimental evidence, it is seen that the most efficient ice nuclei are insoluble in water. Fukata (1958) showed that water soluble salts with ice-like lattice parameters (such as CdI, $NH_4F$, CaI) could not exceed onset temperatures higher than ~−11° C. The difficulty in nucleation is thought to be a result of the instability of the ice embryo caused by the diffusion of water molecules and substrate molecules across the embryo surface. For this reason, it was thought that an efficient nucleus should be hydrophobic in nature. The hydrophobic surface can be thought of as forcing the surrounding water molecules into an "uncomfortable" state, thereby making crystallization energetically more favorable than the supercooled phase. Furthermore, the increased energy of the substrate/liquid interface ($\gamma S_L$) will reduce the contact angle with the ice crystal and thereby favor nucleation.

While most of the classical theories of heterogeneous ice nucleation were developed with inorganic compounds such as AgI, there is research on organic crystal nuclei from the 1960's. A major incentive for using organic nuclei is the possible lower costs when compared to those of inorganic nuclei. Fukata (1963,1966) tested 329 organic compounds and found that metaldehyde could nucleate ice as high as −0.4° C. when exposing particles (less than 13$\mu$ in diameter) to water vapor. Six other compounds, acetoacetanilide, p-bromoacetphenone, coumarin, m-nitroaniline, phtalic anhydride, 2,4,6-trichloroaniline showed ice nucleation thresholds almost as high as metaldehyde (−1.5° C. to −1° C.) when exposing the freshly ground samples to water vapor.

One of the main differences between organic and inorganic nuclei is the fact that the former can participate in hydrogen bonding with the water molecules. Head, R. B., Journal of Physical Chemistry—Solids, Vol. 23, 1962, pp. 1371, was the first to show that hydrogen-bonding is essential for organic ice nucleation. Garten, et al., (1965) expresses the idea of hydrogen bonding group (HBG) density by implying that the most efficient organic nuclei have HBG densities (3–4 per 100 $Å^2$) which are lower than those of ice (5–7 per 100 $Å^2$). When the density on any plane exceeds the latter figure, the substrate becomes hydrophilic, and for reasons expressed above, the nuclei become ineffective. Garten later adds that the effect of excess HBG's is to stabilize the denser structure of liquid water rather than that of ice to higher undercoolings. Molecular symmetry, as Fukata (1966) points out, is also important. It was claimed that organic molecules with rotational symmetry are better nuclei than non-symmetrical molecules since the former cannot avoid exposing their active HBG's at the surface. Non-symmetrical molecules, on the other hand, will tend to point their HBG's inward since the hydrogen bond is energetically costly and a minimum surface free energy is desirable. Consequently, the contact angle between the ice embryo and the HBG's on the non-symmetrical molecules will be high, inhibiting nucleation.

Figure 6:
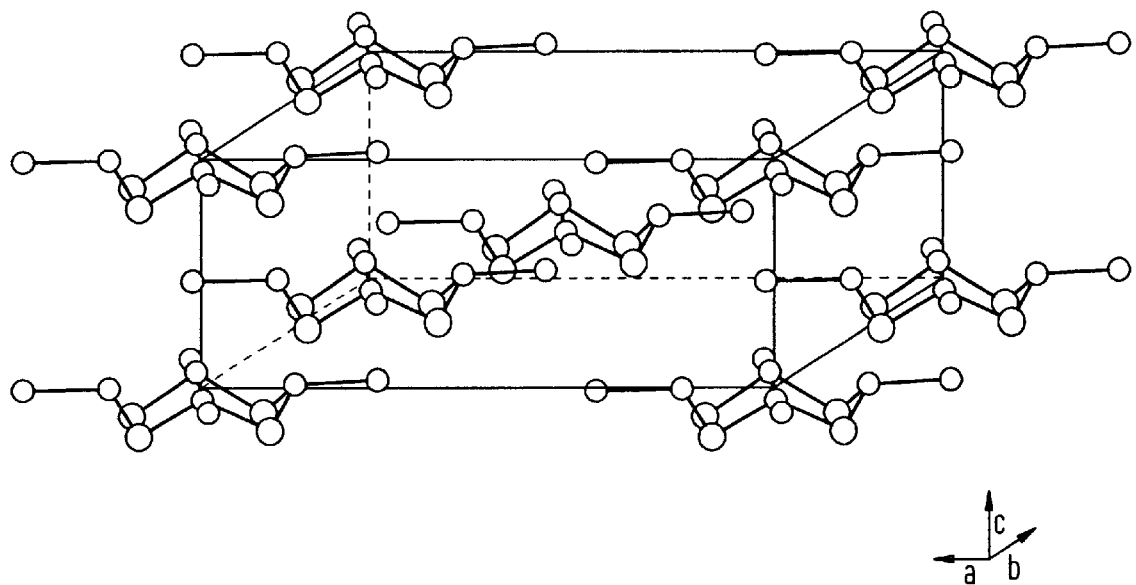
FIG. 6 shows a body-centered tetragonal unit cell of metal dehyde showing the columnar arrangement of the tetramers.
Figure 7:
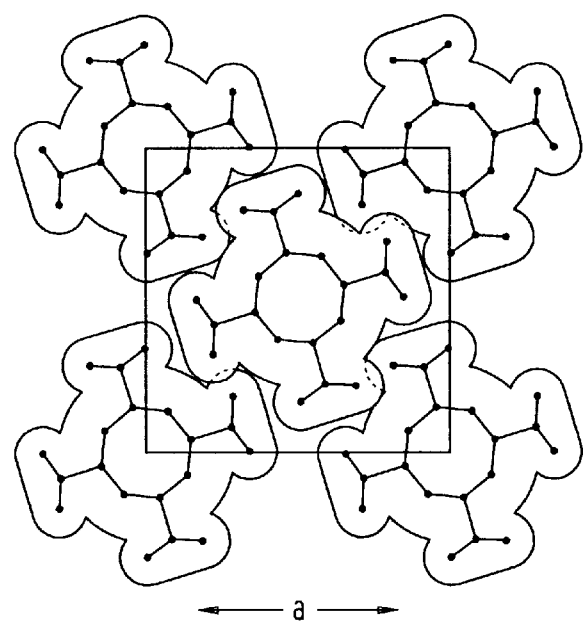
FIG. 7 shows an axial view of the packing arrangement of the metaldehydes tetramers revealing the steric effects of the bulky methyl groups.

A preferred nucleating agent of this invention is metaldehyde. Metaldehyde $(CH_3CHO)_4$, the cyclic tetramer of acetaldehyde, still possesses the highest nucleation temperature for crystalline substances at −0.4° C. (Fukata 1963). The structure, as deduced by Pauling, L., Journal of the American Chemical Society, Vol. 57, pp. 2680, produces some interesting crystal properties. First, the tetragonal lattice parameters of $a_0$=10.40 Å and $c_0$=4.11 Å of the unit cell are close to that of ice, hence making it a potential ice nucleant. The puckered 8-member ring (C—O distance=1.43±0.03 Å, C—C distance=1.54±0.03 Å) creates a negatively charged plane of oxygens (facing down) and a positively charged plane of hydrogens (facing up). Consequently, when packing these tetramers, the molecules will stack in weakly-interacting columns oriented in the c-directions. This can be understood by the fact that the oppositely charged faces cause strong attractive forces in the c-direction while the inactive, bulky methyl groups shield the columns from each other. The methyl groups are approximately equidistant from each other, having two groups a distance of 3.90 Å away, four at 4.03 Å and two at 4.11 Å (directly above and below). This arrangement yields a packing radius for the methyl groups of 2.01±0.06 Å. As a result of the steric effects of the methyl groups, metaldehyde will form long bundles of easily cleaved fibers if allowed to recrystallize slowly in any suitable solvent. (THF or chloroform). A body centered tetragonal unit of metaldehyde is shown in FIG. 6, and an axial view of the packing arrangement of metaldehyde tetramers is shown in FIG. 7.

Another interesting phenomenon is the fact that the $c_0/2$ translation in each column relative to its four nearest neighbors brings the molecular dipole into an electrostatically stable configuration in which the oppositely charged poles are arranged as nearest neighbors.

Fukata (1968) refers to this dipole stabilization as a pyroelectric effect. It was further cited that this effect is beneficial in cloud seeding since it allowed the metaldehyde smoke particles to induce polarization and attraction of the water droplets.

Metaldehyde, like other organic and inorganic (including AgI) nuclei, is known to be photosensitive. Fukata (1963) showed that after exposing metaldehyde to sunlight for more than one hour at temperatures higher than 55° C., the nucleating property completely disappears. The exact cause of this phenomenon has not been confirmed. It may be due to some free-radical, photo-oxidative process as exhibited by phologlucinol and α-phenazine (Garten 1965). The vanishing nucleating properties could also be due to the decomposition of metaldehyde to paraldehyde (cyclic trimer of acetaldehyde) at 80° C. Regardless of the cause the temperature range of the specific nucleation application for metaldehyde needs to be taken into account.

Metaldehyde (and organic crystals in general) have lost their research appeal as heterogeneous nuclei since the 1960's and have given way to inorganic AgI-based compounds. One explanation is that metaldehyde, while much cheaper than AgI and better in terms of onset nucleation temperature, is not as active as AgI at higher undercoolings; specifically, the number of active nuclei per gram of substrate is almost four orders of magnitude lower for metaldehyde than AgI (Garten 1965). This relative specific inactivity in metaldehyde is probably more a concern in cloud seeding (which was the application in mind) since individual smoke particles have to nucleate independently. Another possible reason for the decline in interest in metaldehyde (and other organics) is its toxicity problem. Metaldehyde is widely used as snail poison and may pose a risk to humans if consumed (Morgan, D. P., "Miscellaneous Pesticides, Solvents, and Adjuvents," in Recognition and Management of Pesticide Poisonings, $4^{th}$ ed., Chapter 15, Environmental Protection Agency, March 1989). This toxicity issue would be important if metaldehyde were used as a cloud seeder (as it was intended to be); however, if immobilized in a cementitious matrix, the toxicity issue becomes less important. If metaldehyde did spread to natural environments, contamination would be minimal since metaldehyde would depolymerize to acetaldehyde and oxidize eventually to harmless levels of acetic acid.

In order to place the metaldehyde in the air voids, the commercial grade metaldehyde particle size has to be reduced, because the average air void is roughly 100 microns in diameter. In addition, a mechanism for transporting the metaldehyde into air voids had to be established. To reduce the particle size we initially tried ball milling the metaldehyde. However, the ball-milled metaldehyde showed no effective nucleating abilities. Next we tried grinding the metaldehyde, and found that the ground metaldehyde effectively nucleated freezing around $-1°$ C.

To account for the difference between the ball-milled and the ground metaldehyde's nucleating ability, we performed x-ray diffraction on each of the samples. The results illustrate a predominance of the most effective nucleating plane (viz., the (110) crystallographic plane) exposed in the ground sample, while the milled sample showed a more uniform distribution of exposed planes. This result leads to the conclusion that vigorous ball-milling randomized the exposed planes, while the subtle grinding catalyzed cleavage predominately along the nucleating plane. In addition, this result confirms Fukata's suggestion that the (I 10) plane is the effective plane of nucleation.

Two types of metaldehyde-containing cement paste samples were produced: metaldehyde with and without air entrainment. Incorporation of metaldehyde into the air voids could only be accomplished in the sample with air entrainment. To accomplish this deposition, the air entrainment agent is thoroughly mixed with the ground metaldehyde before adding the solution to the cement paste.

The influence of metaldehyde on the freezing behavior of the cement paste was evaluated using the DMA (Dynamic Mechanical Analyzer). The DMA measures dilation in a sample as a result of freezing. After analyzing both samples it appeared that the metaldehyde worked effectively: samples with and without air showed a higher freezing point and gradual dilation. For reference a plain paste sample was also run, and showed an abrupt dilation at roughly $-9°$ C. The elevated freezing point shows that metaldehyde is effectively nucleating freezing around $-3°$ C.

Effectiveness of Air Entrainment

The effectiveness of entrained air voids in protecting concrete from freeze/thaw damage is well known. According to most microscopic theories of frost action, air voids act as escape boundaries for the rejected water, whether originating from hydraulic, diffusion or osmotic mechanisms. Properly entrained concrete has shown good resistance to internal cracking and scaling in the laboratory under standard ASTM C 666 freeze-thaw tests which subject samples to 300 freezing and thawing cycles typically at a rate of $6°$ C./h to $8°$ C./h.

Experiments have also shown that the most reliable measure for frost protection is the air void spacing factor, $\overline{L}$; although recognized as a useful parameter, it is not easy to measure. The main cause for this difficulty arises from the fact that air-voids are randomly distributed in the cement paste. Microscopical evaluation of polished concrete samples (as outlined in "Standard Practice for microscopical determination of air-void content and parameters of the air-void system in hardened concrete," Annual Book of ASTM Standards, ASTM, Philadelphia, Pa., 1990) is the only direct measurement of the spacing factors; however, this procedure is time consuming and certainly not applicable for on-site assessments. It would be ideal if there were a way to predict and consistently control the air-void network. Current ASTM C 457 procedure provides simple equations as guidelines but they tend to grossly oversimplify the random air-void network.

Numerous studies have been conducted to better approximate the random distribution of air voids. Attiogbe, E. K., "Mean Spacing of Air-Voids in Hardened Concrete," ACI Materials Journal, Vol. 90, No. 2, March–April 1993, pp. 174–181; Attiogbe, E. K., "Predicting Freeze-Thaw Durability of Concrete—A new Approach," ACI Materials Journal, V. 93, No. 5, 1996, pp. 457–464, for example, accounts for the randomness of the voids by coupling the idea of a mean factor, $\bar{s}$, and the parameter F, which represents the fraction of the total paste volume within the radial distance $\bar{s}$ from the edges of the air-voids. However, it is questionable whether any mathematical model can accurately account for the instabilities that are inherent with entraining air in concrete.

Despite fairly good predictability of freeze-thaw behavior in the laboratory, concrete structures still suffer from frost damage in practice. The problem of air-entrainment can essentially be reduced to two questions: (i) What are the required air void characteristics (e.g., spacing factors) for the specific concrete system in use? (ii) How can the air-void system be preserved in a reliable and consistent manner during the setting of cement?

In terms of the first question, the chemistry of the cement binder has a direct influence of the pore structure, and hence, the freezing properties of the concrete. As previously discussed, the permeability (quantified by $r_{BT}$) will significantly affect the resistance to induced internal pressures. The lower the permeability, the more resistance the displaced water will experience, and thus, higher stresses are generated. To compensate for low-permeability concretes made using admixtures such as water-reducing agents and silica fume, a greater air content must be entrained in the concrete to ensure a shorter spacing length. This practice is disadvantageous in two ways. First, increasing the entrained air necessarily decreases the strength of the concrete, thus, possibly negating the benefits of the admixtures altogether. Second, and probably more important, is that the spacing factor will vary depending on the characteristics of the cement paste in the concrete. This makes standardization of building practices very difficult, if not impossible.

Taking all types of cements into consideration, it is generally thought that a spacing factor of 200–250 $\mu$m represents an adequately frost resistant concrete (Marchand). As mentioned earlier, the real problem is the reproducibility of generating an air-void network with a desired spacing factor. Since there is no direct technique to measure spacing factors onsite, our national standards only require the measurement of total air content (a readily measurable parameter) rather than spacing factors. It is generally believed that air contents in the range of 5% to 8% by volume correlate with frost protected spacing factors (on the order of 200 $\mu$m). However, experience has shown that this assumption is not a valid one. In fact, it was seen that spacing factor can vary considerably with a given air content. Specifically, a 6% air content can yield a spacing factor of 100 $\mu$m to 400 $\mu$m (Saucier, F., Pigeon, M. and Cameron, G., "Air Void Stability—Part V: Temperature, General Analysis and Performance Index," ACI Materials Journal, Vol. 88, 1991, pp. 25–36). This discrepancy could easily make the difference between a durable, frost resistant concrete and a frost prone concrete.

The reasons for the poor correlation between air content and spacing factor are believed to result from three sources of bubble instability: buoyancy, coalescence and dissolution effects. The net effect of these instabilities result in an increase in the spacing factors, and hence, a decrease in frost resistance. Buoyancy effects refer to the phenomenon of the tendency for larger bubbles to rise to the surface and to be expelled from the paste. This phenomenon results from the fact that the buoyancy force (proportional to volume, $\pi d^3/6$) for larger bubbles can overcome the shearing frictional force (proportional to $\pi d$). The coalescence of air bubbles results from the drive to reduce the free energy of the system by decreasing the interfacial surface area of the bubble. For two identical volume air bubbles with the same surface tension, the coalescence of the two bubbles result in 21% reduction in energy of the two bubble system (Marchand). Dissolution of air is the third source of instability and it comes from the fact that the solubility of air increases with pressure, and the pressure inside an air bubble is inversely proportional to its diameter (Kelvin's law). Thus, small air bubbles have a tendency to collapse due to the solubility effect.

These bubble instabilities are even more pronounced during the transportation and pumping of concrete where significant air losses can occur. It would be ideal if a void system could be produced in concrete that has a controllable spacing factor. Moreover, it would be advantageous to minimize the spacing factor to ~100 $\mu$m or less. This is not a feasible solution for the air entrainment technique since the inclusion of more air voids will necessarily reduce the strength of concrete and allow for further cracking of the matrix.

To avoid the problems of instability and unreliability of air voids produced using air-entrainment agents, we prefer to use porous ceramic shells for air entrainment. The preparation and use of such shells is described in the following section.

Hollow Shells as Alternative to Air Entrainment

Hollow shell technology has attracted attention in applications such as low dielectric constant materials, fiber-optic microsensors, light weight composites and impact resistant materials (Wilcox, D. and Berg, M., "Microsphere Fabrication and Applications: An Overview," in Materials Research Society Symposium Proceedings, Vol. 392, Hollow and Solid Spheres and Microspheres: Science and Technology Associated with Their Fabrication and Application, 1994, pp. 3–13). One method of preparing well-shaped hollow and spherical particles is by spray pyrolysis (SP). The technique differs from the well-established technique of spray drying in the use of solutions (rather than slurries), the process of precipitation or condensation within the droplet, and the use of significantly higher temperatures (~>300° C.). During SP, the solution is continuously atomized in a series of reactors where aerosol droplets experience solvent evaporation and solute condensation within the droplet, drying, thermolysis of the precipitate to form a microporous particle, and finally sintering to achieve full density.

Either solid or hollow spheres can result from SP depending on droplet size, solute concentration, precursor supersaturation and evaporation rate (Charlesworth, D. and Marshall, W., Journal of the American Institute of Chemical Engineering, Vol. 6, No. 9, 1960; Leong, K., Journal of Aerosol Science, Vol. 18, pp. 511, 1987). From modeling of the evaporation phase of SP, Messing, G. Zhang, S. C. and Jayanthi, G. V., "Ceramic Powder Synthesis by Spray Pyrolysis," Journal of the American Ceramic Society, Vol. 76, No. 11, 1993, pp. 2707–26, predicts that hollow shells of different thickness can be obtained depending on the concentration gradient at the onset of precipitation. If the precipitate shell is sufficiently permeable, the remaining solvent can be removed and the hollow shell structure can be preserved.

The properties of the precursor solution, including thermal characteristics, must be known because they can profoundly effect the particle morphology during the various SP stages. In general, SP studies have been confined to aqueous precursor solutions of highly soluble metal chlorides and oxychlorides as well as other water-soluble metal salts such as nitrates, acetates and sulfates (Messing 1993). Very few studies have dealt with colloidal precursors, as would be required for hollow clay shells. An understanding of the colloid chemistry of the dispersion is required for shell processing, especially concerning the stability of the dispersion at the high operating temperatures during SP.

Hollow shells with porous walls can be produced economically by processes such as spray drying and SP; moreover, they can be prepared with mean diameters on the order of 50–150 microns. Therefore, such shells could be used to provide air entrainment in mortar or concrete without the use of chemical air-entrainment agents. The shells could be introduced as an ingredient in the concrete mix, so that the quantity and size of the air voids would be guaranteed. The shells could be pretreated to impregnate them with a nucleating agent, such as metaldehyde, to enhance their effectiveness for frost protection.

EXAMPLES

Metaldehyde possess one of the highest nucleation temperatures for ice nuclei in the vapor phase (~-0.4° C., Fukata 1963); however, little is known about the freezing capabilities (ice nucleated from the liquid phase) of metaldehyde. Furthermore, from the cited literature, the mode of preparation and molecular structure of an ice nucleant is known to have a drastic effect on the nucleating properties. Thus, an effort to isolate the critical parameters affecting the freezing nucleation capabilities of metaldehyde was conducted. Freezing experiments were done on metaldehyde-impregnated Vycor glass samples having uniform 100 Å pores.

PROCEDURES (a) Materials

The metaldehyde $(C_2H_4O)_n$ used in this investigation was manufactured by Fluka Chemika. The chemical formula of metaldehyde is often denoted as $(C_2H_4O)_n$ since there is a strong tendency for the tetramer units $(CH_3CHO)_4$ to form long fibers (as discussed earlier). Metaldehyde should not be confused with polyacetaldehyde (Natta, 1961) which has the same unit but an entirely different head-to-tail arrangement (C—O—C connectivity). Metaldehyde was prepared by several different methods (crushing in mortar and pestle, washing on a Buchner funnel with water, dissolving the THF and then precipitating in different solvents) to determine optimal nucleating properties. Coumarin ($C_9H_6O_2$), or 2H-1-Benxopyran-2-one, was also tested for its nucleation properties since it was cited as a potential freezing nuclei (Fukata 1966).

(b) Vycor Glass Experiments

Commercial brand Vycor glass from Corning Glass Works was used during the experiment. Vycor glass is prepared by melting a homogeneous mixture of sodium borosilicate liquid and then quenching the mixture to a temperature below the coexistence and spinodal curve where it phase separates into two interpenetrating phases. The boron rich phases is leached out leaving behind a silica skeleton with a known distribution of pores sizes. The average pore size is ~100 Å.

The Vycor glass samples were first crushed into pieces small enough to fit into the 50 $\mu$l DSC pans. The samples were immersed in a 30% hydrogen peroxide solution and heated up to ~70° C. for several hours to remove any organic impurities absorbed by the glass. A soak in distilled water was then conducted followed by drying in a 50° C. oven until the samples were clear.

Prior to conducting freezing experiments, dry Vycor samples were submerged in distilled water for ~1 hour to ensure complete saturation. Water absorption capacities of Vycor samples were estimated by heating saturated samples in a Perkin Elmer Thermal Gravametric Analyzer (TGA 7) and noting the stabilized weight loss. Vycor samples were impregnated with metaldehyde by soaking in a ~6.5 mg metaldehyde/ mL THF solution at a temperature of ~60° C. for ~1 hour and then precipitating in a 0° C. water bath (while stirring). When testing the saturation capacities of the impregnated samples in the TGA, maximum heating temperatures were ~40° C. Metaldehyde was visualized in the Vycor samples by viewing in a Nikon SMZ-U Zoom 1:10 optical microscope with polarizing filters.

(c) Differential Scanning Calorimetry (DSC)

DSC scans were performed on a Perkin Elmer Pyris I Differential Scanning Calorimeter with a cooling and heating rate of 1° C./min. Calibration was provided by melting pure water and n-decane samples.

For nucleation experiments with metaldehyde, approximately 1 mg of sample was placed on the bottom of the pan. A single drop of water (diameter ~1 mm to 2 mm) was then pipetted over the metaldehyde and gentle rearrangement of the metaldehyde was done to ensure intimate contact between the water droplet and the nuclei particles. The weight of the sample pan was recorded before and after the DSC run; if any weight loss occurred, the test was discarded.

(d) Surface Morphology

The surface morphology of the metaldehyde samples was investigated by scanning electron microscopy (SEM) on a Philips XL 30 FEG-SEM. Samples were carbon coated with a thickness of ~20 nm prior to viewing.

RESULTS/DISCUSSION (a) Ice Nucleation by Metaldehyde

As developed in the theoretical section of the investigation, the properties of ice nuclei will depend on several factors including size, surface contamination, exposure of active sites and age. To isolate some of these factors and their effects on the nucleation capacity of metaldehyde, several different preparation methods were devised (see table).

| Sample name | Description of the different preparation routes for metaldehyde. Description |
|---|---|
| As-received | Metaldehyde taken from the bottle. Care was taken not to damage the needles while placing the samples in the DSC pans. |
| Crushed | Metaldehyde crushed in a mortar and pestle. Testing of the sample in the DSC directly followed the crushing. To test the effects of age on the crushed samples, the crushed samples was stored in a sealed glass scintillator bottles for ~1 month. |
| Water washed | Metaldehyde washed on a Buchner funnel with a vacuum. Approximately 1 L of distilled water was used per gram of metaldehyde. |
| Washed/crushed | Metaldehyde washed as above then crushed in a mortar and pestle. |
| THF ppt/0° C. | Crushed metaldehyde dissolved in a ~6.5 mg metaldehyde/ml THF solution at ~60° C., then precipitated in a 0° C. distilled water (while stirring). Sample was collected on a Buchner funnel. |
| THF ppt/25° C. | Same as above but precipitated in 25° C. distilled water. |

During cooling, in the DSC, the sample will crystallize at a temperature, $T_C$, corresponding to the onset of the exothermic freezing peak: The temperature was determined by the Pyris 1 DSC software, which takes the intersection of the tangent at the inflection point of the freezing exotherm with the baseline of the curve. It is important to remember that the nucleation process is a statistical event (based on the fortuitous groupings of water molecules) so multiple runs of a specific sample will give a range of onset temperatures scattering around a mean onset crystallization temperature, $T_{C,avg}$. The table below lists the DSC results for the metaldehyde samples, the as-received and crushed coumarin samples and distilled water.

| Onset temperatures obtained from DSC scans for metaldehyde (MA), coumarin (CO) and distilled water. | | |
|---|---|---|
| Sample | Number of samples | Range of activity [° C.] | Crystallization temperature, $T_{C,avg}$ |
| As-received AM | 5 | −11.5 to −7.6 | −9.1 |
| Crushed MA | 8 | −3.8 to −2.6 | −3.3 |
| Aged crushed MA | 3 | −4.2 to −3.4 | −3.8 |
| Water washed MA | 10 | −9.8 to −7.0 | −8.3 |

-continued

Onset temperatures obtained from DSC scans for metaldehyde (MA), coumarin (CO) and distilled water.

| Sample | Number of samples | Range of activity [° C.] | Crystallization temperature, $T_{C,avg}$ |
|---|---|---|---|
| Washed/crushed MA | 6 | −3.7 to −3.2 | −3.4 |
| MA THF ppt/0° C. | 6 | −6.5 to −1.8 | −5.0 |
| MA THF ppt/25° C. | 5 | −8.1 to −4.3 | −6.1 |
| As-received CO | 3 | −15.4 to −7.4 | −11.1 |
| Crushed CO | 5 | −7.8 to −4.0 | −6.1 |
| Distilled water | 3 | −15.5 to −15.3 | −15.4 |

It seems that the largest effect in improving nucleation temperatures is to crush the sample. Crushing will increase the surface area, and more importantly, will increase the density of sites (presumably the basal planes in metaldehyde) in the sample. Both freshly crushed metaldehyde (crushed and crush/wash) samples possessed the highest onset temperature at ~3.3° C.

Aging showed little, if any, change in the nucleating properties of the crushed sample. A discrepancy of only ~0.5° C. separated the aged crushed and crushed samples.

Washing the impurities away with water does not seem to have a large effect on metaldehyde as evidenced by similar onset temperatures between the unwashed and washed samples. The slight increase in onset temperature of the water washed compared to the as-received sample could very well be due to inadvertent crushing of the metaldehyde when collecting the sample off the Buchner funnel.

Allowing the crushed metaldehyde to recrystallize in a warm THF solution will decrease the onset temperature. Quickly precipitating in a 0° C. water bath seems to possess better nucleating potential than the slower 25° C. precipitate. Even though the $T_{C,avg}$ for the two different precipitates only differ by ~1° C., it is noteworthy that the 0° C. precipitate was the only sample to possess an onset temperature greater than ~2° C. Furthermore, the amount of precipitate collected from the 25° C. water bath was very small, as most of the metaldehyde tended to stay in solution. The 0° C. precipitate, however, dropped out of solution almost instantaneously in much larger quantities.

Coumarin followed the same trends as metaldehyde in the sense that the crushed samples yielded significantly higher onset temperatures than the as-received. Solubility in ethanol and hot water (not attempted) certainly makes coumarin attractive in terms of ease of impregnating porous shells; on the other hand, coumarin has suspected toxic and carcinogenic properties.

(b) Morphology of Metaldehyde

Depending on the mode of preparation, metaldehyde will have varying surface morphologies. Estimated form optical microscopy and SEM images, the approximate characteristic dimensions of the various forms of metaldehyde can be seen in the table below.

Dimensions of various metaldehyde forms estimated from optical microscopy and SEM.

| Sample | Length | Thickness |
|---|---|---|
| As-received | 500 µm to 1 mm | 50 µm to 100 µm |
| THF ppt/0° C. | 100 µm to 200 µm | Less than 10 µm |
| Crushed* | Less than 50 µm | Less than 5 µm |
| THF ppt/25° C. | Less than 10 µm | Less than 5 µm |

*Most of the crushed sample was much smaller than the upper limit of 50 µm and 5 µm for the length and thickness, respectively. These upper limits represent the dimensions of the residual as-received crystals that were only partially broken down during the crushing process.

(c) Porous Glass Experiments

At full saturation, the cleaned and dried Vycor glass was measured to absorb water up to ~49.5% of its weight (0.495 g of water/g of dry Vycor). This measurement was made from heating samples in a TGA (for greater precision) on several Vycor glass samples submerged in distilled water for several days (ensuring full hydration). Furthermore, for the small DSC Vycor samples (~3 mg), it was found that only 20 minutes was required to fully saturate the sample. Thus, since the degree of saturation will effect the locations of the freezing and melting peaks in scanning calorimetry experiments (Takamuru, T., Yamagami, M., Wakita, H., Masuda, Y. and Yamaguci, T., "Thermal Property, Structure, and Dynamics of Supercooled Water in Porous Silica by Calorimetry, Neutron Scattering and NMR Relaxation," Journal of Physical Chemistry B., Vol. 101, 1997, pp. 5730–5739), submersion times were at least 30 minutes to ensure consistent water contents.

It was found that metaldehyde could be precipitated in the 100 Å Vycor pores by precipitating a saturated Vycor sample (containing a warm metaldehyde/THF solution) in a 0° C. water bath. The metaldehyde can clearly be visualized in an optical microscope by a brownish, grain-like Vycor interior. Taking advantage of metaldehyde's crystallinity, polarizing filters can induce a dramatic scattering effect in the impregnated sample.

Since metaldehyde is a hydrophobic material, the absorption capacities of the 5 impregnated samples were analyzed. Results showed no evidence of a repulsion effect, and in fact, the samples showed an increase in absorption capacities to ~65.8% (g water/g Vycor). The increase in absorption for the impregnated samples is thought to be a result of the damage of the porous network due to the extra dying cycles required for the impregnation procedure. This idea is supported by the finding that repeated submersion and drying of the impregnated samples showed further increases in absorption to ~94.2%.

Figure 8:
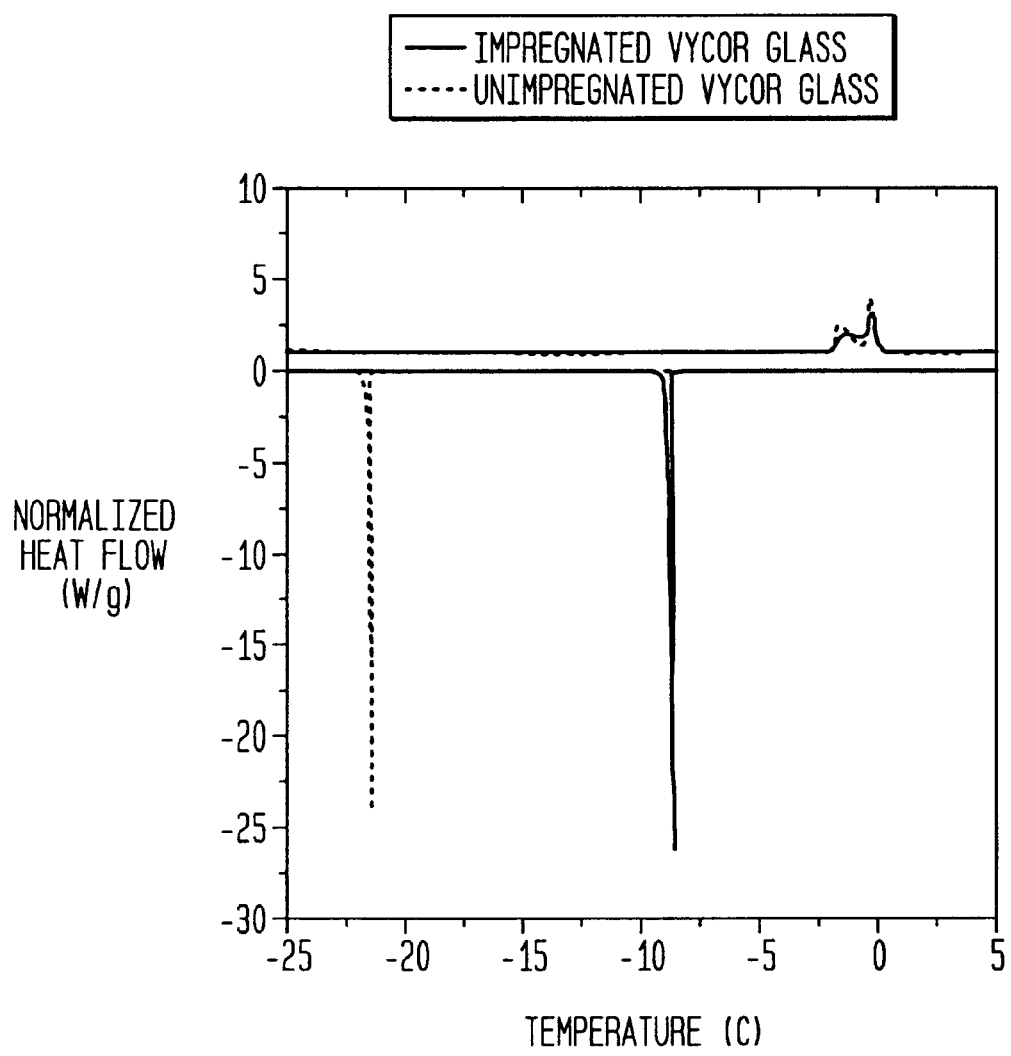
FIG. 8 is a graph of DSC comparison of the impregnated and unimpregnated Vycor glass sample.

Cooling a fully hydrated Vycor sample from −3° C. to −30° C. and heating from −30° C. to 5° C. shows the presence of one sharp freezing peak and a double melting peak (or sometimes a single uneven broad peak. The difference between the onset freezing peak and the melting peak is the characteristic nucleation undercooling, $\Delta T_c$. Freezing a metaldehyde impregnated Vycor sample (by precipitating the warm THF solution in 0° C. water) also reveals one characteristic freezing and a double or broad melting peak. The location of the melting peak was fairly consistent (indicating fairly uniform pore sizes) for all samples. The freezing peak, however, was shifted to higher temperatures by ~10° C. when metaldehyde was present in the pores of the glass. The average undercoooling for the impregnated Vycor was ~7.1° C. while the unimpregnated samples scattered around a $\Delta T_c$ of 17.1° C. See FIG. 8.

A comparison of the nucleating properties in the pores of unimpregnated and impregnated Vycor glass samples

| Sample | Freezing, $T_c$ [° C.] | Melting, $T_m$ [C] | $\Delta T_c$ [° C.] | Average $\Delta T_c$ [° C.] |
|---|---|---|---|---|
| Unimpregnated | −15.0 | −1.8 | 13.2 | 17.1 |
|  | −21.5 | −1.8 | 19.7 |  |
|  | −21.5 | −2.4 | 19.1 |  |
|  | −18.8 | −2.4 | 16.4 |  |
|  | −18.9 | −2.2 | 16.7 |  |
| Impregnated | −8.5 | −1.8 | 6.7 | 7.1 |
|  | −10.3 | −2.4 | 7.9 |  |
|  | −9.1 | −2.4 | 6.7 |  |

It is surprising that the metaldehyde in the 100 Å pores of the Vycor sample ($\Delta T_c$=7.1° C.) behaves relatively similar to the metaldehyde precipitated directly from the warm THF solution in 0° C. water ($\Delta T$=5.0° C.). First of all, the size of the metaldehyde crystals in the 100° A pores will certainly be significantly smaller due to the size constrictions. (Fletcher predicts that the nucleating capacity of a spherical catalyst will decrease precipitously when radii are less than ~100 Å. The surface morphology of the precipitate should also be altered since the quenching rate will be slower (controlled by the diffusion of water into the pores. Despite these potential hindrances to nucleation in the 100 Å pores, the confined metaldehyde only sees a depression of ~2° C. from the freely precipitated sample.

(d) Implications of Metaldehyde Nucleation on Frost Action in Concrete

For impregnated microshells to show any noticeable frost action improvements, the shells must initiate ice growth before significant crystallization and hydraulic pressures can be generated. Crystallization and hydraulic pressures should only induce tensile stresses over 3 MPa when temperatures are $\leq$−5° C. (corresponding to a $r_{BT}$ of ~13 nm) and −4° C. ($r_{BT}$ of ~16.7 nm), respectively. The freely precipitated metaldehyde from 0° C. water with an average onset temperature of about −5° C. and a maximum near −1.8° C. can certainly compete with these onset temperatures. The freely precipitated metaldehyde, rather than the impregnated metaldehyde in the Vycor glass, is used in the comparison since it was argued that the onset temperature of the metaldehyde in the Vycor glass was depressed due to the effects of the confined geometry in the 100 Å pores. The shells will presumably be ~100 μm, thus minimizing any geometric effects in nucleation. Furthermore, it is most important for the metaldehyde to nucleate before $T_{BT}$, or the point where crystallization and hydraulic pressures begin to become potentially dangerous. With an onset nucleation temperature of −5° C., the impregnated shells should be able to significantly improve the frost action of pastes with a $r_{BT}\leq$13 nm by confining the ice in the voids and removing the percolation event (i.e., the progressive invasion of ice through the pore space) altogether. This implies that the metaldehyde-impregnated shells should have the biggest impact on very fine pastes with low characteristic breakthrough radii. For pastes with $r_{BT}$>13 nm, percolation through the cement body could occur; however, the crystallization and hydraulic pressures that are generated will probably be below 3 MPa, causing little damage to the concrete.

The impregnated shells would also be integral in the event of a delayed surface nucleation. Since tensile stresses generated from delayed surface nucleation can reach as high as ~8 times that of the stresses generated from spontaneous nucleation (assuming a surface nucleation temperature at −10° C.), it is important to remove the freezeable water before the surface nucleation takes place. If the impregnated shells can consistently nucleate at −5° C., there should be very little freezeable water by the time the concrete reaches −10° C. Hence, potentially devastating stresses of ~20 MPa should be avoided with use of the shells.

(e) Ceramic Microshell Design and Function

Ideally, the ceramic hollow shells will be relatively strong in tension (greater than 3 MPa), sufficiently porous (to allow for liquid flows) and able to nucleate ice at maximum temperatures (ideally before $T_{BT}$).

The strength and porosity of the shell will be strongly influenced by the firing temperature of the ceramic material. Being relatively inexpensive, kaolin is an attractive candidate for the shell material. Kaolin clay consists of mainly ordered kaolinite ($Al_2SiO_5(OH)_5$), with some mica and free quartz. The firing temperature will presumably be in the range between ~700° C. and ~1000° C., thereby ensuring the increased porosity of metakaolin ($Al_2O_3.2SiO_2$) derived from the dehydroxylation of kaolinite at ~520° C. and the added strength due to partial densification. At 980° C., metakaolin goes through a series of transformations as it rearranges into a spinel and then into small mullite crystals.

The increased strength of the shells will impart benefits since crystals will be able to grow in voids where the surrounding walls can support higher tensile stresses before fracture. Thus, with shell tensile strengths potentially greater than 3 MPa, crystallization induced failure should be delayed to higher undercoolings. Furthermore, inclusions of the shells could also improve concrete mechanical properties such as fracture toughness and impact resistance provided that the shells have a high aspect ratio (defined as the ratio between the outer radius and the wall thickness) and a larger Young's modulus compared to the matrix (Liu, J.G. and Wilcox, D. L., "Design Guidelines and Water Extraction Synthesis Capabilities for Hollow Icrospheres for Low Dielectric Constant Inorganic Substances," in Hollw and Solid Spheres and Microspheres: Science and Technology Associated with Their Fabrication an Application, Materials Research Society Symposium Proceedings, Vol. 372, Materials Research Society: Pittsburgh, 1995, pp. 231–237).

As mentioned before, increasing the strength of the shells implies a decrease in porosity. The shells must be sufficiently porous to allow water to contact the metaldehyde. If water cannot penetrate into the interior of the voids, the entire purpose of the shells, that is to remove the freezeable water from the cement pores, will be lost. Ideally, the metaldehyde will line the inner walls of the shell. However, with the intended impregnation by soaking the shells in a warm THF/metaldehyde solution followed by precipitating in a 0° C. water bath, there will inevitably be metaldehyde in the pores of the wall. The hydrophobicity problem, that is the concern of hydrophobing the shell to the point of total repulsion of water, will probably not be an issue (while not confirmed definitively) as suggested by the impregnated Vycor glass experiments. Even if there is a repulsion effect, there are bound to be pores where metaldehyde is absent, thus allowing water to freely penetrate into the void.

The size of the void space in the shells should be large enough to avoid any undercooling effects (dictated by the Gibbs-Thomson effect). This would allow for maximum nucleation temperature by the metaldehyde. The shell size will be on the order of an air void, ~100 $\mu$m in diameter, so size effects will be negligible. With the diameter known, the concentration of shells can be calculated by requiring a total void space volume at least equal to the volume of theoretical ice in the paste (calculated from the amount of freezeable water in the paste).

Once nucleation occurs in the void space, there should be a draining of the water from the paste into the void. Each shell (like an air-void) will have a characteristic sphere of influence. The net volume of paste intercepted by the individual spheres should cover the entire paste to ensure total protection. Furthermore, the growing crystal creates suction in the liquid (which is responsible for migration of the water to the void), and that reduces the risk of cracking by putting the surrounding concrete into compression.

It is understood that the embodiments described herein are merely exemplary and that a person skilled in the art may make many variations and modifications without departing from the sprit and scope of the invention. All such variations and modifications are intended to be included within the scope of the invention.

What is claimed is:

1. A method of protecting concrete from freeze damage comprising incorporating an amount of air into a cementitious mixture to form air voids in the concrete formed by the cementitious mixture, the cementitious mixture including an amount of an air entrainment agent and an effective agent for raising the nucleation temperature of ice to at least approximately −5° C. for nucleating ice in the air voids upon the freezing of the concrete.

2. The method of claim 1 wherein the nucleating agent comprises metaldehyde.

3. The method of claim 2 wherein the metaldehyde consists of tetrameric units ($CH_3CHO)_4$.

4. The method of claim 2 wherein the air entrainment agent contains a surfactant.

5. The method of claim 2 wherein the metaldehyde is ground to expose the crystal planes that are most effective for nucleating ice.

6. The method of claim 2 wherein the air entrainment composition includes ceramic shells impregnated with metaldehyde.

7. The method of claim 2 wherein the amount of air is from about 3% to about 8% by volume.

8. A method of protecting concrete from freeze damage comprising incorporating an amount of air into a cementitious mixture to form air voids in the concrete formed by the cementitious mixture, the cementitious mixture including an amount of an air entrainment composition and an effective amount of an agent for raising the nucleation temperature of ice to at least approximately −5° C. for nucleating ice, selected from the group of metaldehyde, acetoacetanilide, p-bromoacetphenone, coumarin, m-nitoaniline, pthalic anhydride, and 2,4,6-trichloraniline for nucleating ice in the air voids.

9. The method of claim 8 wherein the air entrainment composition comprises ceramic shells impregnated with an agent for nucleating ice.

10. The method of claim 8 wherein the air entrainment composition comprises glass ceramic shells impregnated with an agent for nucleating ice.

11. The method of claim 8 wherein the air entrainment composition comprises shells of kaolin impregnated with an agent for nucleating ice.

12. The method of claim 8 wherein the air entrainment composition comprises clay shells inpregnated with an agent for nucleating ice.

13. A method for protecting concrete from freeze damage comprising:

mixing an air entrainment composition into a cementitious mixture to form air voids in the concrete;

adding an agent for raising the nucleation temperature of ice to at least approximately −5° C. for nucleating ice in the cementitious mixture; and allowing the cemetitious mixture to form concrete.

14. The method of claim 13 wherein the agent for nucleating ice is added to the air entrainment composition before mixing- the air entrainment composition with the cementitous mixture.

15. The method of claim 14 wherein the agent for nucleating ice comprises metaldehyde.

16. A concrete composition including pores and air voids comprising a nucleating agent within the air voids for raising the nucleation temperature of ice to at least approximately −5° C. for nucleating ice within the air voids.

17. The composition of claim 16 wherein the nucleating agent comprises metaldehyde.

18. A method of protecting concrete from freeze damage by providing an air entrainment agent comprising mixing an amount of hollow porous shells into a cementitious mixture, introducing a nucleating agent for raising the nucleation temperature of ice to at least approximately −5° C. for forming ice in the hollow porous shells, and allowing the cementitious mixture to form concrete, wherein the hollow porous shells allow water to pass thereinto.

19. A concrete composition comprising a cementitious mixture with porous hollow shells mixed therein for allowing water to pass thereinto, to prevent freeze damage to the concrete composition; and a nucleating agent for raising the nucleation temperature of ice to at least approximately −5° C. for forming ice in the porous hollow shells.

20. The composition of claim 19 wherein the porous hollow shells are formed of a ceramic material.

21. The composition of claim 19 wherein the porous hollow shells are formed of clay.

22. The method of claim 1, wherein the effective agent raises the nucleation temperature of ice to at least approximately −1° C.

23. The method of claim 8, wherein the agent raises the nucleation temperature of ice to at least approximately −1° C.

24. The method of claim 13, wherein the agent raises the nucleation temperature of ice to at least approximately −1° C.

25. The method of claim 16, wherein the nucleating agent raises the nucleation temperature of ice to at least approximately −1° C.

26. The method of claim 18, wherein the nucleating agent raises the nucleation temperature of ice to at least approximately −1° C.

27. The method of claim 19, wherein the nucleating agent raises the nucleation temperature of ice to at least approximately −1° C.

28. A method of protecting concrete from freeze damage comprising introducing hollow porous shells containing a nucleating agent for raising the nucleating temperature of ice to at least approximately −5° C. into a cementitious mixture, and allowing the cementitious mixture to form concrete, wherein the hollow porous shells allow water to pass thereinto and the nucleating agent causes ice to form therein.

29. The method of claim 28, wherein the nucleating agent raises the nucleation temperature of ice to at least approximately −1° C.